United States Patent
O'Connor et al.

(10) Patent No.: US 11,763,360 B1
(45) Date of Patent: Sep. 19, 2023

(54) INTELLIGENTLY IDENTIFYING ITEMS FOR RESALE

(71) Applicant: Block, Inc., San Francisco, CA (US)

(72) Inventors: Matthew O'Connor, New York, NY (US); Roshan Jhunja, Scarsdale, NY (US); Megan Karande, Brooklyn, NY (US); Justin Van Slembrouck, Brooklyn, NY (US); Noah Batterson, Brooklyn, NY (US)

(73) Assignee: Block, Inc., Oakland, CA (US)

( * ) Notice: Subject to any disclaimer, the term of this patent is extended or adjusted under 35 U.S.C. 154(b) by 364 days.

(21) Appl. No.: 16/573,975

(22) Filed: Sep. 17, 2019

(51) Int. Cl.
  *G06Q 30/00* (2023.01)
  *G06Q 20/22* (2012.01)
  *G06Q 30/0601* (2023.01)

(52) U.S. Cl.
  CPC .............. *G06Q 30/0601* (2013.01); *G06Q 20/223* (2013.01)

(58) Field of Classification Search
  CPC .................................................. G06Q 30/0601
  USPC ......... 705/26.1, 1.1, 37, 40, 28, 30; 709/225; 707/102, 513
  See application file for complete search history.

(56) References Cited

U.S. PATENT DOCUMENTS

| | | | |
|---|---|---|---|
| 7,568,200 B2* | 7/2009 | Weiss | G06Q 10/087 705/28 |
| 7,891,562 B1 | 2/2011 | Saltzman et al. | |
| 8,392,276 B1 | 3/2013 | Saltzman et al. | |
| 9,965,796 B2 | 5/2018 | Dhar et al. | |
| 10,672,059 B2 | 6/2020 | Dhar et al. | |
| 11,423,491 B1 | 8/2022 | O'Connor et al. | |

(Continued)

OTHER PUBLICATIONS

First Action Interview Office Action Summary mailed Aug. 25, 2021, for U.S. Appl. No. 16/583,117, of O'Connor M., et al., filed Sep. 25, 2019.
Notice of Allowance mailed Apr. 11, 2022, for U.S. Appl. No. 16/583,117, of O'Connor M., et al., filed Sep. 25, 2019.
Pre-interview First Office Action mailed Apr. 1, 2021, for U.S. Appl. No. 16/583,117, of O'Connor M., et al., filed Sep. 25, 2019.

(Continued)

*Primary Examiner* — John H. Holly
(74) *Attorney, Agent, or Firm* — Lee & Hayes, P.C.

(57) ABSTRACT

Techniques described herein are directed to intelligently identifying items for resale based on digital records of past purchases. A computing system of a payment processing service can analyze digital record(s) of a user that are representative of previous purchase(s) of the user. Based at least partly on analyzing the digital record(s), an item previously purchased by the user can be identified as a candidate for resale to another user. The computing system can monitor marketplace(s), and can determine, based at least partly on monitoring the marketplace(s), item information for the item. The computing system can create, based at least partly on the item information, a listing for an ecommerce channel that enables the user to sell the item. The listing can include an actuation mechanism that enables the other user to purchase the item, a transaction for which can be processed by the payment processing service.

20 Claims, 13 Drawing Sheets

(56) References Cited

U.S. PATENT DOCUMENTS

| | | | |
|---|---|---|---|
| 2010/0250382 A1* | 9/2010 | Babaria | G06Q 40/12 705/26.1 |
| 2012/0166267 A1 | 6/2012 | Beatty et al. | |
| 2013/0290149 A1 | 10/2013 | Rashwan | |
| 2014/0052587 A1 | 2/2014 | Bereck et al. | |
| 2020/0294115 A1 | 9/2020 | Dhar et al. | |
| 2022/0383426 A1 | 12/2022 | O'Connor et al. | |

OTHER PUBLICATIONS

ProQuestNPL Search History.*
Supplemental Notice of Allowability mailed Apr. 20, 2022, for U.S. Appl. No. 16/583,117, of O'Connor M., et al., filed Sep. 25, 2019.
Supplemental Notice of Allowability mailed May. 16, 2022, for U.S. Appl. No. 16/583,117, of O'Connor M., et al., filed Sep. 25, 2019.
Supplemental Notice of Allowability mailed Jul. 5, 2022, for U.S. Appl. No. 16/583,117, of O'Connor M., et al., filed Sep. 25, 2019.

\* cited by examiner

US 11,763,360 B1

INTELLIGENTLY IDENTIFYING ITEMS FOR RESALE

TECHNICAL FIELD

In a seller environment (e.g., online or brick-and-mortar), users can purchase items from sellers. Such users can receive electronic proof of purchase (e.g., receipts or the like), which can be used for tracking purchases.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
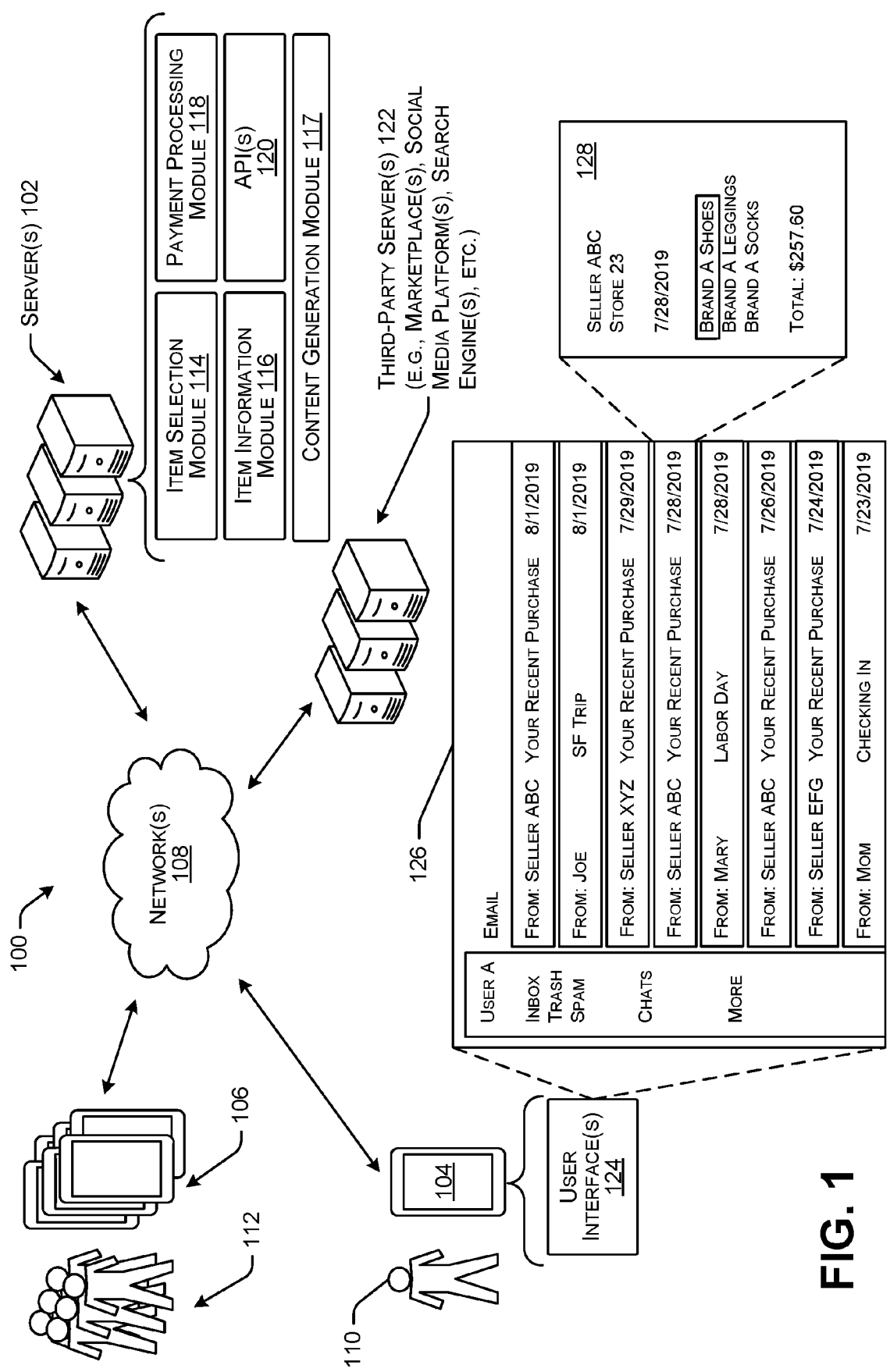
FIG. 1 illustrates an example environment for intelligently identifying items for resale based on digital records of past purchases.

Techniques described herein are directed to intelligently identifying items (e.g., goods, services, etc.) for sale or resale based on digital records of past purchases. In an example, a computing system associated with a service provider can scan, or otherwise monitor, digital records including emails, text messages, social media posts, peer-to-peer payment transactions, and the like, to learn about past purchases of users. In at least one example, such digital records can represent transactions processed by a payment processing service of the service provider. In at least one example, the computing system can parse the digital records to identify items purchased via transactions and information associated with such items (e.g., price, characteristics, etc.). The computing system can identify an item as a candidate for resale to another user. Additionally, the computing system can scan marketplaces (e.g., AMAZON®, ETSY®, EBAY®, etc.) to determine an amount for which the item (e.g., other instances thereof) and/or item(s) similar to the item is/are being sold. In at least one example, the computing system can prompt the owner of the item to sell the item, by presenting the owner with information regarding the resale value of the item and/or a level of interest associated with the item. The owner of the item can opt to list the item for sale and the service provider can facilitate any resulting transaction. That is, the service provider can process payment for a transaction between the owner/seller and a buyer using the payment processing service.

As described herein, previous purchases can be inventory that is waiting to be sold. When users purchase or otherwise acquire item(s) from sellers, a digital record of the purchase can be generated for tracking the purchase(s). In some examples, the digital records can be provided to users via email, text message, social media, or the like. In examples where a user purchases an item via a peer-to-peer payment user interface, the peer-to-peer payment service associated therewith can keep a digital record of the transaction.

In some examples, the service provider can store digital records for transactions processed by the service provider (e.g., via a payment processing service). In additional or alternative examples, functionality associated with the computing system described above can be integrated into one or more sources of digital records, such as an email user interface, a messaging user interface, a social media user interface, a peer-to-peer payment user interface, and the like. In yet another example, the evidence of purchase can be in a paper format, capable of being scanned or uploaded as a digital record. By analyzing digital records, the computing system can identify item(s) that are candidates for resale. In some examples, such candidate item(s) can be identified based on a level of interest observed from transactions processed by the service provider and/or online services such as marketplaces, social media platforms, and/or search engines. Additional details are provided below.

After an item is identified as an item that is a candidate for resale, the computing system can prompt the owner of the item to list the item for sale. In some examples, the computing system can offer a recommended resale value (with insight on how the value of the item has appreciated since the owner purchased the item), recommended timing of when to resell the item, recommended locations where the item can be promoted for sale, recommended ecommerce channel for selling the item, and/or provide the owner with information regarding the level of interest associated with the item. If the owner opts to list the item for sale, the computing system can generate content, which can include information associated with the item (e.g., "item information"), that the owner can use to list the item for sale via an ecommerce channel (e.g., online store, online marketplace, social media, etc.). In some examples, the item information can be associated with a record of the item (e.g., maintained by the service provider) such that if the item is returned, the service provider can use the item information to process the return and/or if the user opts to resell the item, at least a portion of the item information can be reused for reselling the item. In some examples, the computing system can determine the original merchant details, and facilitate re-selling of the item on the same ecommerce platform or a platform of a comparable merchant. This can be a sophisticated implementation, particularly if the merchants leverage the computing system for payment processing or other services such as invoices, payroll, lending, etc.

Techniques described herein identify items that are capable of being sold, based on factors such as market interest, profitability associated with re-sale, etc., and then create marketplaces for such items, even when the owner is not a traditional merchant. By converting purchased items into sellable items, techniques described herein provide frictionless and structured ways to buy and sell.

Techniques described herein can utilize a network-based seller ecosystem to generate a marketplace for users that have previously purchased items to sell such items to other users. That is, techniques described here can leverage integrated functionality, provided by a service provider that can be remotely located from the end users having the integrated functionality, to monitor digital records of previous purchases and to turn such previous purchases into selling opportunities (e.g., inventory). The service provider can then leverage integrated services, such as inventory management, content generation, payment processing, and the like to facilitate transactions as described herein. Techniques described herein can be useful for streamlining the resale (and/or return) process by utilizing information provided in association with a previous purchase to generate item information, which can track the item via one or more transactions facilitated by the service provider. As such, techniques described herein can provide efficiencies for ecommerce transactions.

Furthermore, in at least one example, techniques described herein can utilize machine-trained models to generate customized and/or personalized resale recommendations, for example, with respect to pricing (which can also be referred to as value, cost, etc. throughout this description). For instance, techniques described herein can intelligently determine a price for reselling an item based at least in part on characteristics of individual users and/or groups of similar users. Furthermore, in some examples, techniques described herein can recommend timing of when to resell items, recommend locations where items can be promoted for sale, recommend ecommerce channels for selling items, etc. Such techniques enable a customized and/or personalized approach to generating resale recommendations, which is an improvement over existing one-size-fits-all techniques. Additional improvements are described below with reference to the figures.

Moreover, in some examples, techniques described herein can be directed to analyzing digital records. As described above, the service provider can store digital records for transactions processed by the service provider (e.g., via a payment processing service). In additional or alternative examples, functionality associated with the computing system described above can be integrated into one or more sources of digital records, such as an email user interface, a messaging user interface, a social media user interface, a peer-to-peer payment user interface, and the like. In yet another example, the evidence of purchase can be in a paper format, capable of being scanned or uploaded as a digital record. By analyzing digital records, the computing system can identify item(s) that are candidates for resale. In some examples, the digital records can be analyzed using natural language processing, image recognition, and the like. Furthermore, in some examples, the digital records can be associated with formats that indicate which content can be parsed. Such formats can be sophisticated such that the service provider can parse item information that can be mapped to a particular type of information (e.g., "total content" can map to a total price of an item, "middle content" can map to an item name, and so on). That is, techniques described herein can provide a sophisticated, streamlined mechanism for extracting item information from digital records. This can provide an improvement over existing technologies for analyzing electronic content.

In at least one example, techniques described herein are directed to generating content for items identified as candidates for resale. Generating the content can include offering to host the item on a third-party system for re-sale without seller intervention. In some examples, generating the content translates to pre-populating forms for an ecommerce channel with information extracted from the digital records. In other examples, generating the content means creating a refund link so that the same merchant can accept refunds and re-sell the item. That is, techniques described herein can enable sellers/owners to publish content via one or more ecommerce channels to list items for sale, without the users having to go through the steps of researching an optimal ecommerce channel to sell or even the process to make the item available for sale. As such, techniques described herein provide improvements to existing ecommerce technology. Further, techniques described herein provide improved user interfaces that are directed to particular means for summarizing and presenting information in electronic devices.

While techniques described herein are directed to identifying selling opportunities based on previous purchases, in additional or alternative examples, techniques described herein can be useful for generating an index of items and/or an aggregate set of records that can be used for insurance purposes. That is, techniques described herein are not limited to identifying selling opportunities.

FIG. 1 illustrates an example environment 100 for intelligently identifying items for resale based on digital records of past purchases. In FIG. 1, server(s) 102 can be associated with a service provider, that can provide one or more services, as described below with reference to FIG. 12. In at least one example, the server(s) 102 can communicate with user computing devices, such as an owner/seller device 104 and user devices 106, via network(s) 108. That is, the owner/seller device 104 and the user devices 106 are network-connected devices that enable end users (e.g., an owner/seller 110 and users 112, respectively) to access services provided by the service provider (e.g., via the server(s) 102). Additional details associated with the server(s) 102, the user computing devices (e.g., 104, 106), and the network(s) 108 are described below with reference to FIGS. 12 and 13. While a single owner/seller device 104 (and owner/seller 110) is illustrated in FIG. 1, in a practical application, there can be a plurality of owners/sellers and corresponding owner/seller devices.

In at least one example, the server(s) 102 can include an item selection module 114, an item information module 116, a content generation module 117, a payment processing module 118, and one or more application programming interfaces (APIs) 120.

In at least one example, the item selection module 114 can access digital records associated with transactions of users (e.g., the owner/seller 110 and/or users 112) to identify item(s) that are candidates for resale to other users. In at least one example, the item selection module 114 can parse individual of the digital records to extract information associated with previously purchased items, for example using natural language processing, image recognition, and the like. Such information can include prices paid for the items, item characteristic(s) (e.g., size, condition, color, age, manufacturer/brand, etc.), seller characteristics (whether the original seller processes payment transactions through the server(s) 102), an identifier of the item, an item description, and so forth. In at least one example, the item selection module 114 can analyze digital records to determine whether the format of a digital record corresponds to that of a transaction record (e.g., at least includes an item and a purchase price). In at least one example, for instance, where the service provider (e.g., via the payment processing module 118) processes payment for a transaction, the service provider (e.g., the server(s) 102) can generate a digital receipt that is organized in a particular format that the item selection module 114 can recognize and easily extract information as described above.

In some examples, the item selection module 114 can analyze digital records of transactions processed by the service provider. As described below, the payment processing module 118 can process transactions on behalf of sellers associated with the service provider. In at least one example, the payment processing module 118 can generate a digital record associated with a transaction that indicates item(s) sold, item information, a total cost of the transaction, cost(s) of individual item(s), payment data used to satisfy the cost of the transaction, and other information associated with the transaction. In some examples, such a digital record can be associated with a digital receipt that is provided to the user (e.g., via email, text message, etc.). In other examples, such a digital record can be stored by the service provider (e.g., in data store(s) as described below). In any event, the item selection module 114 can analyze such digital records to identify item(s) that are candidates for resale to other users based on factors, such as predicted demand from other users, profitability associated with resale, change in demand over time, and/or likelihood of resale.

As described above, the evidence of a purchase can be in a paper format, capable of being scanned or uploaded as a digital record. That is, in some examples, the owner/seller 110 can receive a paper receipt at a point of sale and can scan or otherwise upload the paper receipt as a digital receipt. The digital receipt can be stored as a digital record and can be analyzed by the item selection module 114 as described herein.

In additional or alternative examples, the item selection module 114 can analyze digital records of transactions processed by entities other than the service provider. For example, the service provider can expose functionality and/or services via one or more APIs 120, thereby enabling functionality and/or services described herein to be integrated into various functional components of the environment 100. In such examples, such digital records can include emails, text messages, social media posts (e.g., associated with a transaction and/or associated with content posted depicting and/or describing an item), peer-to-peer payment transactions, and the like.

The API(s) 120, which can be associated with the server(s) 102, can provide functionality for analyzing digital records, payment processing functionality, and the like to various functional components associated with the environment 100. At least one of the API(s) 120 can be a private API, thereby availing services and/or functionalities to functional components (e.g., applications, etc.) that are developed internally (e.g., by developers associated with the service provider).

At least one of the API(s) 120 can be an open or public API, which is a publicly available API that provides third-party developers (e.g., email service providers, messaging service providers, social media platforms, peer-to-peer payment service providers, etc. as described herein) with programmatic access to a proprietary software application or web service of the service provider. That is, the open or public API(s) can enable functionality and/or services of the service provider to be integrated into functional components providing email user interfaces, messaging user interfaces, social media user interfaces, peer-to-peer payment user interfaces, etc. The API(s) 120 can include sets of requirements that govern how applications, or other functional components, can interact with one another.

In some examples, the service provider can provide third-party entities with a software developer kit ("SDK") that may utilize functionality exposed by the API(s) 120. The SDK can include software development tools that allow a third-party developer (i.e., a developer that is separate from the service provider) to include functionality and/or avail services as described herein. The SDK and/or the API(s) 120 may include one or more libraries, programming code, executables, other utilities, and documentation that allows a developer to directly include functionality and/or avail services described herein within an application, such as third-party applications providing email services, messaging services, social media services, peer-to-peer payment services, etc., as described herein.

In at least one example, service providers providing a conduit for enabling users to generate and/or access digital records (e.g., via functional components for accessing email services, messaging services, social media services, peer-to-peer payment services, etc., as described herein) can integrate functionality associated with the item selection module 114 into their own functional components providing email user interfaces, messaging user interfaces, social media user interfaces, peer-to-peer payment user interfaces, etc. In such examples, the item selection module 114 can analyze digital records associated with transactions processed by the service provider and/or third-party entities. Similarly, in at least one example, the service provider and/or third-party entities can provide input/output interfaces that enable users to scan or otherwise upload digital records of paper receipts. In such an example, the item selection module 114 can analyze digital records associated with transactions processed by the service provider and/or third-party entities.

In some examples, the item selection module 114 can exclude and/or prioritize digital records when considering resale candidates based at least in part on the items associated with such digital records. For instance, a digital record associated with an item that is perishable, personal (e.g., an item that is for the use of the user and not appropriate for consumption by another user), and/or gifted (e.g., as indicated by a request for a gift receipt or other indication that the item is being purchased as a gift) can be excluded from consideration. Furthermore, in at least one example, the item selection module 114 can prioritize digital records based at least in part on determining that such digital records are associated with a rare item (e.g., an item that has enhanced value because the demand exceeds the supply), an antique item and/or collectable item (e.g., an old item that carries certain nostalgic value and/or is of high quality), and/or a desired item (e.g., where user behavior indicates that the item—or items similar to the item—is requested, discussed, searched for, and/or purchased some number of times that meets or exceeds a threshold, at a frequency that meets or exceeds a threshold (or not), at a price that meets or exceeds threshold(s), etc.). Additional details are provided below.

In at least one example, the item selection module 114 can determine levels of interest associated with items by monitoring transaction(s), marketplace(s), social media platform(s), search engine(s), etc. (e.g., data associated therewith). In some examples, the item selection module 114 can monitor transaction data of transactions processed by the payment processing module 118 to determine levels of interest associated with particular items. In additional or alternative examples, the item selection module 114 can access third-party server(s) 122, which can be associated with marketplace(s), social media platform(s), search engine(s), etc., to determine levels of interest associated with particular items. For example, the item selection module 114 can monitor data associated with marketplace(s) (e.g., marketplace data), social media platform(s) (e.g., social media data), search engine(s) (e.g., search engine data), etc., to identify when user behavior indicates that the item—or items similar to the item—is requested, discussed, searched for, and/or purchased some number of times that meets or exceeds a threshold, at a frequency that meets or exceeds a threshold (or not), at a price that meets or exceeds threshold(s), etc. That is, the item selection module 114 can monitor transaction(s), marketplace(s), social media platform(s), search engine(s), etc., to identify which items are associated with a level of interest indicating that the items are "desired," as described above, or otherwise are candidates for resale to other users. Additional details are described below.

The item information module 116 can determine item information for individual items. In at least one example, such item information can include a recommended resale value of an item, a characteristic of the item, an identifier of the item, and so on. For example, in some examples, the item information module 116 can monitor transaction(s) processed by the service provider and/or marketplace(s) associated with the third-party server(s) 122 to determine amounts for which the item (e.g., other instances thereof) and/or item(s) similar to the item are being offered for sale and/or are being purchased. The item information module 116 can determine a recommended resale value based at least in part on the observed amounts. In some examples, the item information module 116 can access information associated with the other instance(s) of the item and/or item(s) similar to the item, such as condition, size, seller reliability or performance, location of the seller, etc. and can determine the recommended resale value based on such information. Furthermore, the item information module 116 can determine a recommended resale value based at least in part on changes in value/demand, a geolocation associated with the owner/seller or target buyers, preferences of the target buyers, usage levels, changes in seller usage, seller behavior (e.g., usually sells most items that they buy within a year), durability of the item, length of ownership of the item, number of owners of the item, use(s) of the item, a season, a date, a time, etc. For example, if a first instance of the item selling on a marketplace is in poor condition and is selling for $40, and a second instance of the item selling on the marketplace is in good condition and is selling for $60, the item information module 116 can recommend a resale value based on the condition of a particular item, in view of the information accessed from the marketplace.

In at least one example, the item information module 116 can identify one or more target buyers. Such target buyer(s) can be identified by analyzing digital records associated with previous purchases of user(s), monitoring the marketplace(s), social media platform(s), search engine(s), etc., etc. In at least one example, the item information module 116 can identify a target buyer based on identifying items of a set or collection of items purchased by a user, wherein the user is missing a particular item that would complete the set or collection. Or, a target buyer can be identified based on purchasing patterns observed for a particular user and/or user(s) similar to the particular user. Furthermore, the item information module 116 can identify a target buyer based on searches made by a user, social media posts, or the like. In some examples, buyers can add items to a "wish list" (e.g., a data structure storing indications of item(s) that a buyer desires to purchase) and/or the service provider can generate a wish list for a buyer, and the item information module 116 can identify a target buyer based on identifying a particular item on a wish list of such a buyer.

In some examples, a target buyer can be a user deemed to be similar to the owner/seller 110. For example, in at least one example, the item information module 116 can analyze digital records and/or other data associated with the user to identify one or more users that are similar to the owner of an item. In at least one example, the owner/seller 110 and/or the one or more other users can utilize a payment processing service availed by the service provider for transactions. In at least one example, user(s) may be associated with a same geolocation, purchase the same or similar item(s) from the same or similar sellers(s), spend approximately the same amount (e.g., or range) on transactions, have the same or similar sizing, share one or more preferences, etc. In at least one example, the item information module 116 can utilize a machine-trained model to determine similarities between users and/or identify users who are similar to one another. In at least one example, such users can be considered target buyers.

In at least one example, the item information module 116 can determine at least one of a characteristic of an item, an identifier of an item, etc. Characteristic(s) can include a size of an item, a condition of an item, a color of an item, an age of an item, a manufacturer/brand of an item, etc. In some examples, an identifier can comprise a stock keeping unit (SKU), a universal product code (UPC), etc. In at least one example, the item information module 116 can parse digital records to access such information. That is, in at least one example, the item information module 116 can access a description of an item, an image, etc. from a digital record associated therewith. Additionally or alternatively, the item information module 116 can access a product catalog that stores product information (e.g., maintained by the server(s) 102) to access item information. In some examples, if a digital record and/or product catalog does not include information associated with an item, the item information module 116 can access content available via the third-party server(s) 122 to determine item information. For example, the item information module 116 can perform a search for one or more images of the item and/or can access information associated with another instance of the item that is for sale by another seller (e.g., via a third-party marketplace or third-party seller) to access dimensions or sizing of an item.

In at least one example, the item information module 116 can generate item information for an individual item and can associate the item information with a record of the item that is stored in association with the server(s) 102. Such a record can be a catalog and/or inventory record that indicates whether an item is available for sale, has been sold, details associated with individual transactions, a current owner, etc. In at least one example, item information can be updated in near real-time. For example, the item information module 116 can observe changes to pricing, demand, overall resale marketplace patterns and/or trends and can cause updates to such information to be performed in near real-time. Such real-time changes enable the service provider to encourage the owner/seller 110 to hold items or sell items, and, in some examples when to sell items (e.g., immediately or on a certain date). Furthermore, the owner/seller 110 can change attributes associated with the item(s) as they are listed for sale based on such real-time changes. For examples, the user can modify pricing, availability, location, shipping fee, etc.

In at least one example, the content generation module 117 can generate content that includes the item information, or a portion thereof. The content generation module 117 can provide the content to the owner/seller device 104 so that the owner/seller 110 can list the item for sale via one or more ecommerce channels. That is, the owner/seller 110 can list the item for sale via an online store, marketplace, social media platform, etc. In such an example, the owner/seller 110 can provide the content to an online store, marketplace, social media platform, etc. and the online store, marketplace, social media platform, etc. can publish the content for other users to consume and/or interact.

In at least one example, the item information can be used for processing return(s) and/or for facilitating resale of an item. That is, responsive to receiving a request for a return, the server(s) 102 can process the return based at least in part on the item information. Furthermore, in at least one example, responsive to receiving an indication that an owner of an item desires to resell the item, the content generation module 117 can utilize at least a portion of the item information that is stored in association with the record to generate content that can be posted via one or more ecommerce channels for resale. In some examples, the item information can be updated, at least in part, based on a length of time from the original sale, updated pricing (as observed from transactions, marketplaces, etc.), changed demand (e.g., as observed from transactions, marketplaces, social media platforms, and/or search engines), etc.

The payment processing module 118 can, among other things, process transactions to facilitate sales of items listed by owners/sellers to buyers. That is, in at least one example, the payment processing module 118 can access payment data associated with a buyer, send a request for authorization of the payment data to a payment service provider, and process a transaction based on a response from the payment service provider. In other examples, the payment processing module 118 can access an account of the buyer that is maintained by the service provider and can use funds associated with the account to process a transaction. Additional details are described below.

As illustrated in FIG. 1, the owner/seller device 104 is associated with user interface(s) 124 that enable the owner/seller 110 to interact with the owner/seller device 104. The user interface(s) 124 can be presented via web browsers, applications (e.g., desktop or otherwise dedicated, provided by the payment processing provider, provided by a third-party, etc.), or the like to enable the owner/seller 110 to access functionality and/or services as described herein. Similarly, the user devices 106 can be associated with respective instances of user interface(s) (although not illustrated in FIG. 1) which can be presented via web browsers, applications (e.g., desktop or otherwise dedicated, provided by the payment processing provider, provided by a third-party, etc.), or the like to enable the users 112 to interact with the user devices 106 and access functionality and/or services as described herein.

In at least one example, one of the user interface(s) 124 can present a graphical user interface (GUI) 126 from which the owner/seller 110 can manage his or her email. In at least one example, the owner/seller 110 can receive digital records representative of various transactions that the owner/seller 110 has participated in with other sellers (which can be associated with the service provider or not). That is, the owner/seller 110 can be a buyer or seller, dependent on the circumstances. In at least one example, an email/digital record 128 can include information associated with the transaction. For example, the email/digital record 128 can include, but is not limited to, item(s) sold (e.g., Brand A Shoes, Brand A Leggings, Brand A Socks), item information, a total cost of the transaction (e.g., $257.60), payment data used to satisfy the cost of the transaction, and other information associated with the transaction (e.g., Seller ABC, Store 23, date, etc.).

As described above, the item selection module 114 can analyze one or more digital records, such as the email/digital record 128. For instance, the item selection module 114 can parse the email/digital record 128 and can determine that the owner/seller 110 previously purchased Brand A Shoes, Brand A Leggings, and Brand A Socks. In at least one example, the item selection module 114 can utilize techniques described herein to determine that there is a significant level of interest in the Brand A Shoes. That is, the item selection module 114 can determine that the level of interest associated with the Brand A Shoes meets or exceeds a threshold.

In at least one example, the item information module 116 can determine a recommended resale value for selling the Brand A Shoes, using techniques described above. In some examples, the item information module 116 can monitor transaction(s) processed by the service provider and/or service provider(s) associated with the third-party server(s) 122 to determine such a recommended resale value. As described above, the item information module 116 can determine the recommended resale value using one or more additional or alternative techniques. Furthermore, in at least one example, the item information module 116 can determine additional or alternative item information associated with the Brand A Shoes, either from the email/digital record 128 and/or information accessible via service provider(s) associated with the third-party server(s) 122.

Figure 2B:
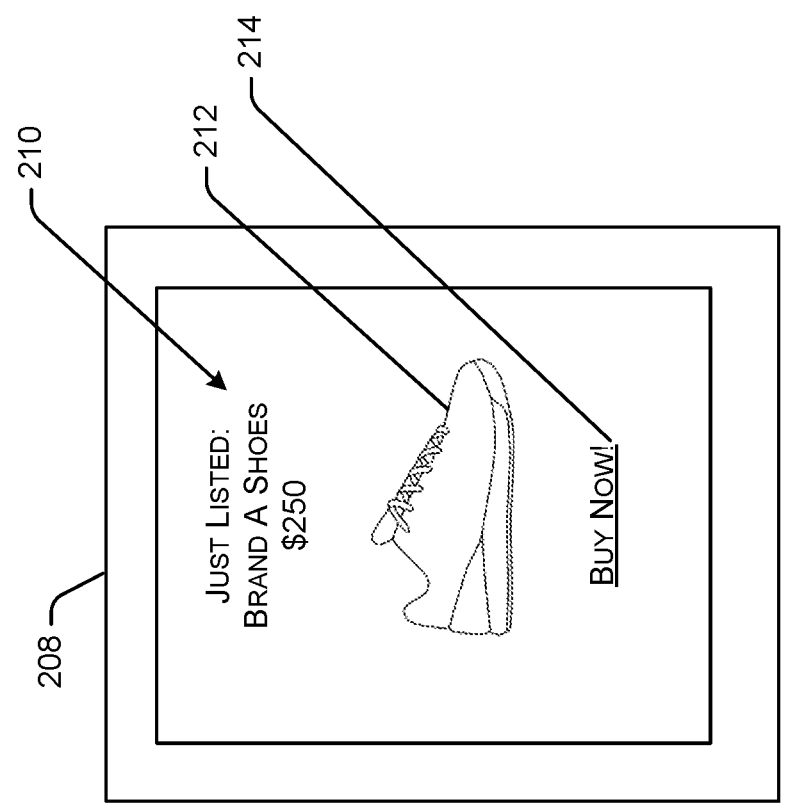
FIGS. 2A and 2B illustrate example graphical user interfaces (GUIs) for presenting information to user(s) as described herein.
Figure 2A:
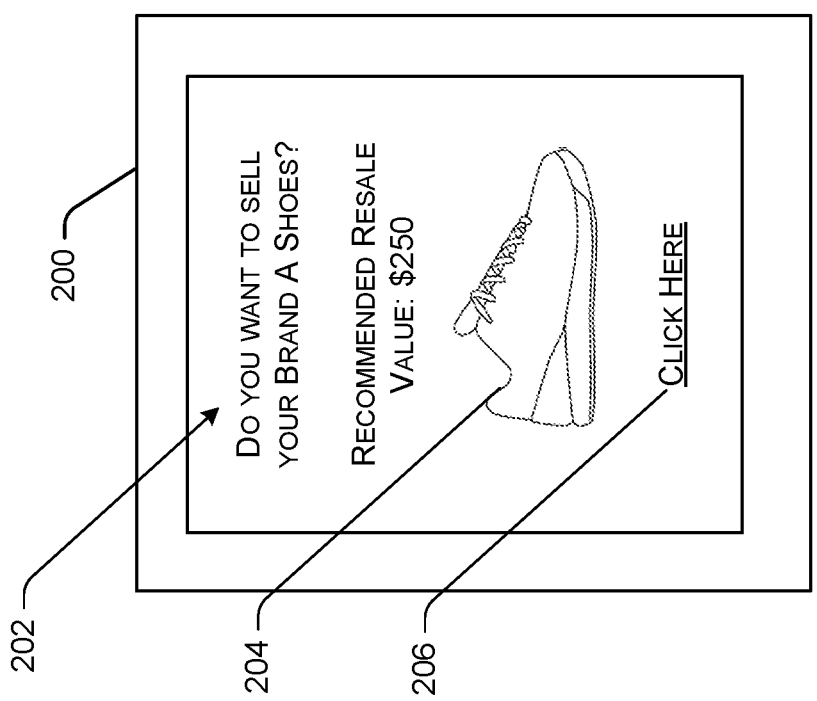

FIGS. 2A and 2B illustrate example GUIs for presenting information to user(s) as described herein.

FIG. 2A illustrates an example GUI 200 for presenting a notification to an owner/seller 110. In at least one example, responsive to the item selection module 114 identifying an item as a candidate for resale (e.g., Brand A Shoes) from an owner/seller's transaction history, and the item information module 116 determining item information associated with the item, the server(s) 102 can send a notification to the owner/seller device 104 that identifies the item as a candidate for resale to a user and includes at least a portion of the item information. As illustrated in FIG. 2A, the GUI 200 can present a notification, which can be transmitted to the owner/seller device 104 as an email, a text message, a push notification, etc. The GUI 200 can include text element(s) 202 that identify the item (e.g., Brand A Shoes) as a candidate for resale to other users and/or item information (e.g., recommended resale value). In some examples, the GUI 200 can include a graphical representation, image, video, etc. (image 204) of the item. In some examples, such a graphical representation, image, video, etc. can be provided by the owner/seller 110 and/or can be accessed via content available via the third-party server(s) 122. In at least one example, the GUI 200 can include an actuation mechanism 206 (e.g., "click here" button) that enables the owner/seller 110 to consent to selling the item. In at least one example, responsive to the owner/seller 110 actuating the actuation mechanism, the content generation module 117 can generate content that the owner/seller 110 can publish via one or more ecommerce channels to list the item for sale. In some implementations, the content can be included in or linked to the item repositories of the ecommerce platform hosting the item for sale.

In at least one example, the content generation module 117 can generate a recommendation regarding the graphical representation, the image, the video, etc. to include in the content. Furthermore, in at least one example, the content generation module 117 can generate a recommendation for a particular ecommerce channel (e.g., based on sales metrics, for example). In some examples, the content generation module 117 can generate the content that includes a recommended price, recommended item description, etc., which can be provided to the content generation module 117 by the item information module 116.

As described above, the item information module 116 can determine item information for individual items. In at least one example, such item information can include a recommended resale value of an item, a characteristic of the item, an identifier of the item, and so on. For example, in some examples, the item information module 116 can monitor transaction(s) processed by the service provider and/or marketplace(s) associated with the third-party server(s) 122 to determine amounts for which the item (e.g., other instances thereof) and/or item(s) similar to the item are being offered for sale and/or are being purchased. The item information module 116 can determine a recommended resale value based at least in part on the observed amounts. In some examples, the item information module 116 can access information associated with the other instance(s) of the item and/or item(s) similar to the item, such as condition, size, seller reliability or performance, location of the seller, etc. and can determine the recommended resale value based on such information. Furthermore, the item information module 116 can determine a recommended resale value based at least in part on changes in value/demand, a geolocation associated with the owner/seller or target buyers, preferences of the target buyers, usage levels, changes in seller usage, seller behavior (e.g., usually sells most items that they buy within a year), durability of the item, length of ownership of the item, number of owners of the item, use(s) of the item, a season, a date, a time, etc.

In some examples, the content generation module 117 can prompt the owner/seller 110 to authenticate and/or verify that they own the item they say they own. For example, the content generation module 117 can prompt the owner/seller 110 to provide an identifier associated with the item, provide an image associated with the item, participate in a video chat, or the like. If an item is authenticated and/or verified, the item information module 116 can add an indication of such to the item information associated with the item.

After the owner/seller 110 publishes the content via the one or more ecommerce channels, the users 112 can access the content, for example via a user interface associated with an online store, a marketplace, an email service provider, a social media platform, etc. In FIG. 2B, an example GUI 208 to enable a user to purchase an item is illustrated. The example GUI 208 can be presented via a user interface associated with an online store, a marketplace, an email service provider, a social media platform, etc. In some examples, the content generation module 117 can perform targeted advertising, whereby the content generation module 117 sends content (e.g., via a text message, email, push notification, publication, etc.) to a selected group of users 112 and/or otherwise promotes the content to a selected group of users 112. The GUI 200 can include text element(s) 210 which present information associated with the item, a graphical representation, image, video, etc. (image 212) of the item, and an actuation mechanism 214 (e.g., "buy now!" button) to enable a user of the users 112 to interact with the GUI 200 to purchase the item.

In some examples, the content generation module 117 can perform one or more image processing techniques to generate a representation of an item that represents a size, fit, or other characteristic of the item. For instance, the content generation module 117 can generate a composite image of an item such that a representation of the item is superimposed or otherwise placed in association with a user having a same or similar size or dimension as the seller, buyer, etc. Or, the content generation module 117 can modify an image of an item to represent another characteristic (e.g., color, condition, etc.).

In at least one example, responsive to a user (e.g., a buyer) actuating the actuation mechanism 214, the server(s) 102 can facilitate a transaction between the owner/seller 110 and the buyer for a cost of the item. In some examples, the payment processing module 118 can store payment data associated with users. In at least one example, the payment processing module 118 can determine an identity of the buyer and can determine whether the payment processing module 118 stores payment data associated with the buyer. If the payment processing module 118 stores payment data associated with the buyer, the payment processing module 118 can process a transaction for the item based at least in part on the stored payment data. Otherwise, the payment processing module 118 can prompt the buyer to provide payment data for processing the transaction. In at least one example, the payment processing module 118 can utilize at least a portion of the item information (e.g., cost) to process the transaction.

In at least one example, the payment processing module 118 can facilitate the transfer of funds from the buyer to the owner/seller 110 and the item from the owner/seller 110 to the buyer. In some examples, the payment processing module 118 can withhold a portion of cost of the transaction from the owner/seller 110 (e.g., as a fee for facilitating the sale). The portion can be based on the cost of the transaction, a fixed fee, etc.

The GUIs 200 and 208 are provided as example GUIs and should not be construed as limiting. GUIs can include additional or alternative information, can be presented via additional or alternative configurations, and/or can be output via additional or alternative output mechanisms.

Figure 3:
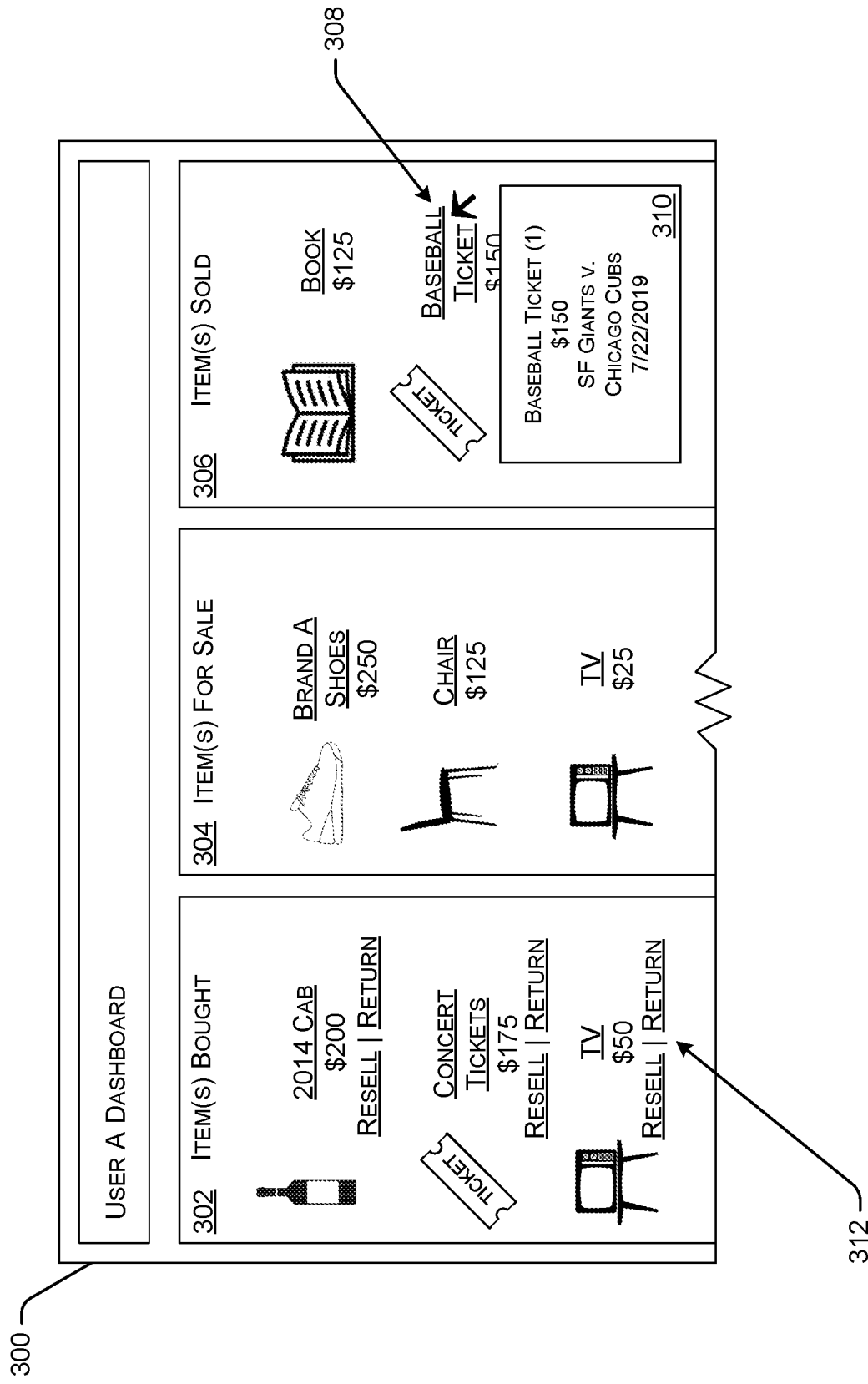
FIG. 3 illustrates an example GUI for enabling users to track item(s) sold, item(s) purchased, and/or item(s) for sale via techniques described herein.

FIG. 3 illustrates an example GUI 300 for enabling users to track item(s) sold, item(s) purchased, and/or item(s) for sale via techniques described herein. In at least one example, the server(s) 102 can present a GUI 300 that enables a user (e.g., User A) to track their purchases, sales, and pending offers for sale. In some examples, this can be similar to a hub, or a dashboard, that gives a user the ability to access and consume information via a single point of access. As illustrated in GUI 300, the user's dashboard can include a first portion 302 that identifies one or more items purchased by the user, a second portion 304 that includes one or more items that are currently listed for sale, and a third portion 306 that identifies one or more item(s) that have previously been sold by the user.

In at least one example, item information can accompany each indication of an item that has been purchased, is pending for sale, and/or has been sold. In at least one example, item information can be updated in near real-time. For example, changes to pricing, demand, overall resale marketplace patterns and/or trends can be presented in near real-time via the GUI 300. For instance, if the price of the Brand A Shoes increases to $275 dollars, the price shown next to the Brand A Shoes can be increased in near real-time. In some examples, the item information module 116 can determine such information and cause updates to such information to be performed in near real-time. By showing real-time changes, the service provider can encourage the user (e.g., User A) to hold items or sell items, and, in some examples when to sell items (e.g., immediately or on a certain date). Furthermore, the user can change attributes associated with the item(s) as they are listed for sale based on such real-time changes. For examples, the user can modify pricing, availability, location, shipping fee, etc.

In some examples, individual items can be associated with an actuation mechanism, such as the actuation mechanism 308 associated with the "baseball tickets," that, when actuated, causes additional information associated with the item and/or the transaction associated with the item to be presented via the GUI 300. In FIG. 3, the item names are shown as underlined to represent a link. In at least one example, the actuation of the actuation mechanism 308 causes a pop-up 310, overlay, or presentation of data to be presented via the GUI 300. However, in an additional or alternative example, individual items can be associated with a control or other actuation mechanism. In at least one example, responsive to a user actuating such an actuation mechanism, the device presenting the GUI 300 can send an indication of such actuation to the server(s) 102. In at least one example, the indication can be associated with an identifier corresponding to the item. Responsive to receiving the indication, the server(s) 102 can access item information associated with the item (e.g., based at least in part on the identifier) and can cause the item information, or a portion thereof, to be presented via the GUI 300, as shown in the pop-up 310.

Further, in some examples, individual items can be associated with actuation mechanisms 312 that enable the user to opt to resell or return an item. Such mechanisms are shown as links but can be controls or other mechanisms that cause a request to be sent to the server(s) 102. When the user actuates one of the actuation mechanisms 312, the device presenting the GUI 300 can send a request to the server(s) 102. Such a request can be associated with an identifier, or other item information, corresponding to the item and an indication of the action intended by the user (e.g., resell, return, etc.). As described above, the server(s) 102 can use the previously generated item information, at least in part, to facilitate the return and/or resale. In some examples, the server(s) 102 can determine the original merchant details, and facilitate re-selling of the item on the same ecommerce platform or a platform of a comparable merchant. As described above, this can be a sophisticated implementation particularly if the merchants leverage the server(s) 102 for payment processing or other services such as invoices, payroll, lending, etc.

In at least one example, if the actuation mechanism is associated with a resell action, responsive to receiving the request, the server(s) 102 can access the item information (e.g., based at least in part on the identifier) and can generate content to facilitate resale of the item. In at least one example, generated content can be used by the user to list the item for sale via one or more ecommerce channels. As illustrated in FIG. 3, the user is reselling an item previously purchased (e.g., the TV). In some examples, the item information module 116 can determine whether the resale value has changed since the last sale and can update the item information and/or content if the resale value has changed.

In at least one example, if the actuation mechanism is associated with a return action, responsive to receiving the request, the server(s) 102 can access the item information (e.g., based at least in part on the identifier) and can process the return. In such an example, the server(s) 102 can facilitate the return of an item to the seller/owner 110 and a refund of the cost of the item to the buyer.

In some examples, the items presented via the GUI 300 can be identified based on transaction data representative of transactions processed by the service provider and/or identified in digital records using techniques described herein. However, in additional or alternative examples, a user can upload and/or otherwise manually add items such that the added items will be included in the information presented via the GUI 300. In at least one example, each item presented via the GUI 300 can be associated with a catalog and/or inventory record stored in association with the server(s) 102 which can track the item as it is purchased, returned, resold, etc. Item information can be associated with such catalog and/or inventory records.

FIGS. 4-11 are flowcharts showing example methods involving techniques as described herein. The methods illustrated in FIGS. 4-11 are described with reference to FIGS. 1, 12, and 13 for convenience and ease of understanding. However, the methods illustrated in FIGS. 4-11 are not limited to being performed using components described in FIGS. 1, 12, and 13, and such components are not limited to performing the methods illustrated in FIGS. 4-11.

The methods 400-1100 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 400-1100 can be combined in whole or in part with each other or with other methods.

FIGS. 4-11 are described in the context of digital records. As described above, digital records can be generated in association with transactions processed, at least in part by a payment processing service. In some examples, digital records can be associated with digital receipts or other digital communications. Additionally, digital records can be received via scans and/or other uploads of a paper receipt that have been provided to the server(s) 102 via an input/output interface.

Figure 4:
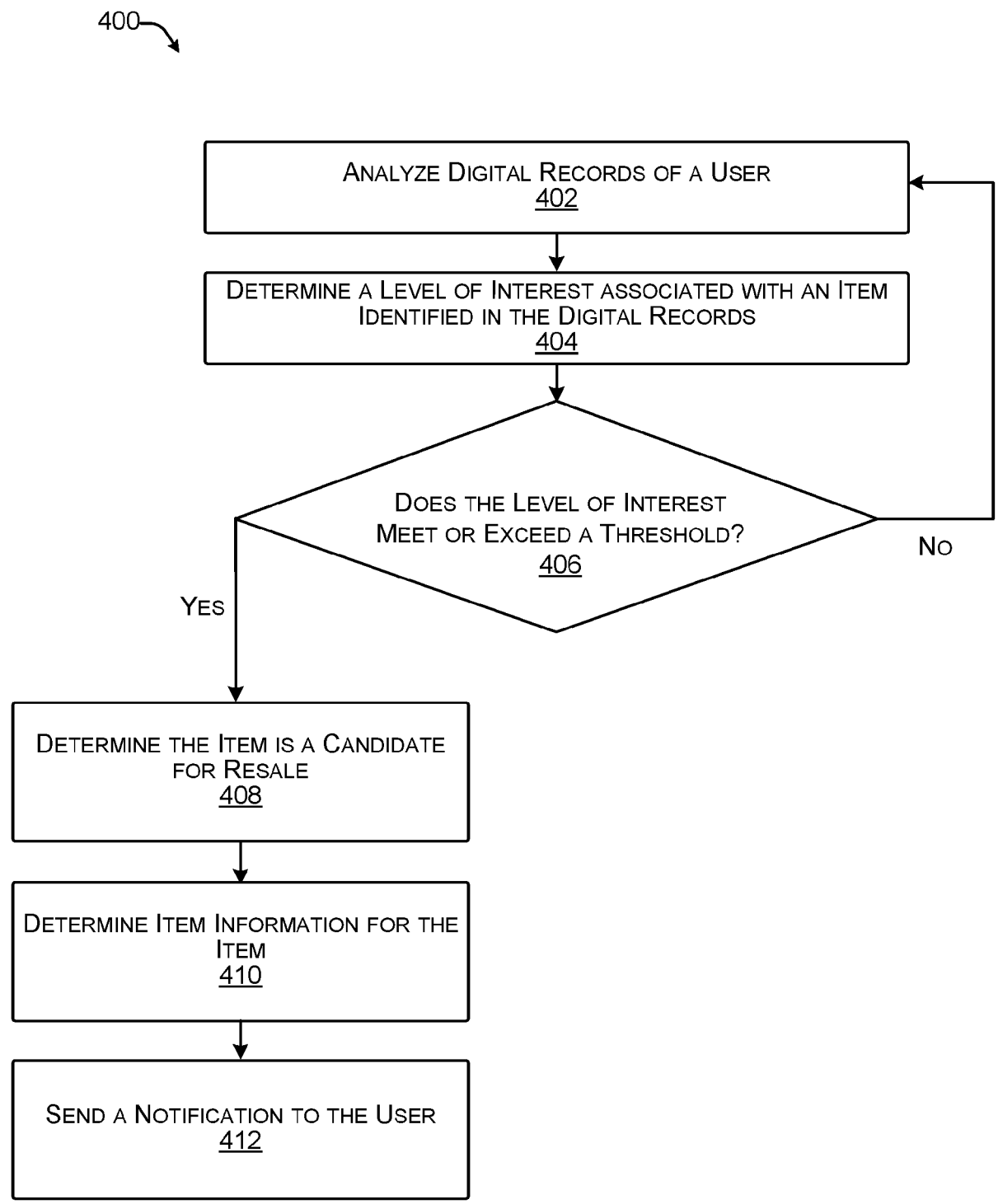
FIG. 4 illustrates an example process for intelligently identifying items for resale based on digital records of past purchases.

FIG. 4 illustrates an example process 400 for intelligently identifying items for resale based on digital records of past purchases.

Block 402 illustrates analyzing digital records of a user. In at least one example, the item selection module 114 can access digital records of users to identify item(s) that are candidates for resale to other users. As described above, digital records can include digital records associated with transactions processed by the service provider and/or digital records associated with emails, text messages, social media posts, peer-to-peer payment transactions, and the like. In at least one example, the item selection module 114 can parse individual of the digital records to extract information associated with previously purchased items, for example using natural language processing, image recognition, and the like. Such information can include prices paid for the items, item characteristic(s) (e.g., size, condition, color, age, manufacturer/brand, etc.), seller characteristics (whether the original seller processes payment transactions through the server(s) 102), an identifier of the item, an item description, and so forth.

As described above, in some examples, the item selection module 114 can analyze digital records of transactions processed by the service provider. In additional or alternative examples, the item selection module 114 can analyze digital records of transactions processed by entities other than the service provider. For example, the service provider can expose functionality and/or services via one or more APIs 120, thereby enabling functionality and/or services described herein to be integrated into various functional components of the environment 100. That is, in at least one example, service providers providing a conduit for enabling users to access digital records (e.g., via functional components for accessing email services, messaging services, social media services, peer-to-peer payment services, etc., as described herein) can integrate functionality associated with the item selection module 114 into their own functional components providing email user interfaces, messaging user interfaces, social media user interfaces, peer-to-peer payment user interfaces, etc. In such examples, the item selection module 114 can analyze digital records associated with transactions processed by the service provider and/or third-party entities.

Block 404 illustrates determining a level of interest associated with an item identified in the digital records. In at least one example, the item selection module 114 can monitor transaction(s), marketplace(s), social media platform(s), search engine(s), etc., to determine a level of interest associated with an item. For instance, the item selection module 114 can monitor transaction(s), marketplace(s), social media platform(s), search engine(s), etc., to identify when user behavior indicates that the item—or items similar to the item—is requested, discussed, searched for, and/or purchased some number of times that meets or exceeds a threshold, at a frequency that meets or exceeds a threshold (or not), at a price that meets or exceeds threshold(s), etc., etc. Such information can be used to determine levels of interest associated with items.

Block 406 illustrates determining whether the level of interest meets or exceeds a threshold. The item selection module 114 can compare the level of interest with a threshold to determine whether the level of interest meets or exceeds a threshold. Additional details associated with determining a level of interest and comparing the level of interest to a threshold are described below with reference to FIG. 7. Based at least in part on the level of interest meeting or exceeding a threshold, the item selection module 114 can identify an item as a candidate item for resale, as illustrated in block 408.

It should be noted that while a level of interest is described above with reference to determining whether an item is a candidate item for resale, in at least one example, one or more other factors can be considered in determining whether an item is a candidate item for resale. For example, in some examples, volume and/or availability can be considered in determining whether an item is a candidate for resale. In an example, if three widgets are in demand and two are available for sale, the item selection module 114 can analyze digital records to determine whether there is another widget that can be offered for sale (e.g., to satisfy the demand). Moreover, the length of time a seller has owned or otherwise possessed an item can be a factor considered in determining whether an item is a candidate item for resale. For example, if a seller has owned an item for a period of time (which can be gleaned from analyzing digital records), the item selection module 114 can determine that the item is a candidate item for resale. In some examples, the period of time can be based on a version of the item (e.g., a watch, a phone, etc.). In other examples, the period of time can be determined dynamically based on characteristics of the user, buyer, location, and the like. In some examples, these factor(s) can be considered in view of interest or individually.

Block 410 illustrates determining item information for the item. The item information module 116 can determine item information for individual items. In at least one example, such item information can include a recommended resale value of an item, a characteristic of the item, an identifier of the item, and so on.

In at least one example, the item information module 116 can monitor transaction(s) processed by the service provider. Additionally or alternatively, the item information module 116 can monitor marketplace(s) associated with the third-party server(s) 122. The item information module 116 can determine what amounts the item (e.g., other instances thereof) and/or item(s) similar to the item are selling for and/or are being purchased for via the transaction(s) and/or marketplace(s). The item information module 116 can determine a recommended resale value based at least in part on the observed amounts. In some examples, the item information module 116 can access information associated with the other instance(s) of the item and/or item(s) similar to the item, such as condition, size, etc. and can determine the recommended resale value based on such information. In some examples, the item information module 116 can determine a recommended resale value based at least in part on a geolocation associated with the owner/seller or target buyers, preferences of the target buyers, durability of the item, length of ownership of the item, number of owners of the item, use(s) of the item, a season, a date, a time, etc.

In at least one example, the item information module 116 can determine at least one of a characteristic of an item, an identifier of an item, etc. Characteristic(s) can include a size of an item, a condition of an item, a color of an item, age of the item, a manufacturer/brand of an item, etc. In some examples, an identifier can comprise a SKU, a UPC, etc. In at least one example, the item information module 116 can parse digital records to access such information. That is, in at least one example, the item information module 116 can access a description of an item, an image, etc. from a digital record associated therewith. Additionally or alternatively, the item information module 116 can access a product catalog that stores product information (e.g., maintained by the server(s) 102) to access item information. In some examples, if a digital record and/or product catalog does not include information associated with an item, the item information module 116 can access content available via the third-party server(s) 122 to determine item information.

In at least one example, the item information module 116 can generate item information for an individual item and can associate the item information with a record of the item that is stored in association with the server(s) 102. Such a record can be a catalog and/or inventory record that indicates whether an item is available for sale, has been sold, details associated with individual transactions, a current owner, etc.

Block 412 illustrates sending a notification to the user. In at least one example, responsive to the item selection module 114 identifying an item as a candidate for resale and the item information module 116 determining item information associated with the item, the server(s) 102 can send a notification to the owner/seller device 104 that identifies the item as a candidate for resale to a user and includes at least a portion of the item information. Such a notification can be transmitted to the owner/seller device 104 as an email, a text message, a push notification, etc. In at least one example, responsive to the owner/seller 110 responding to the notification with an indication that the owner/seller desires to list the item for sale, the content generation module 117 can generate content that the owner/seller 110 can publish via one or more ecommerce channels to list the item for sale, without the user having to go through the steps of researching an optimal ecommerce channel to sell or even the process to make the item available for sale.

Based at least in part on determining that the level of interest does not meet or exceed the threshold, process 400 can return to block 402.

Figure 5:
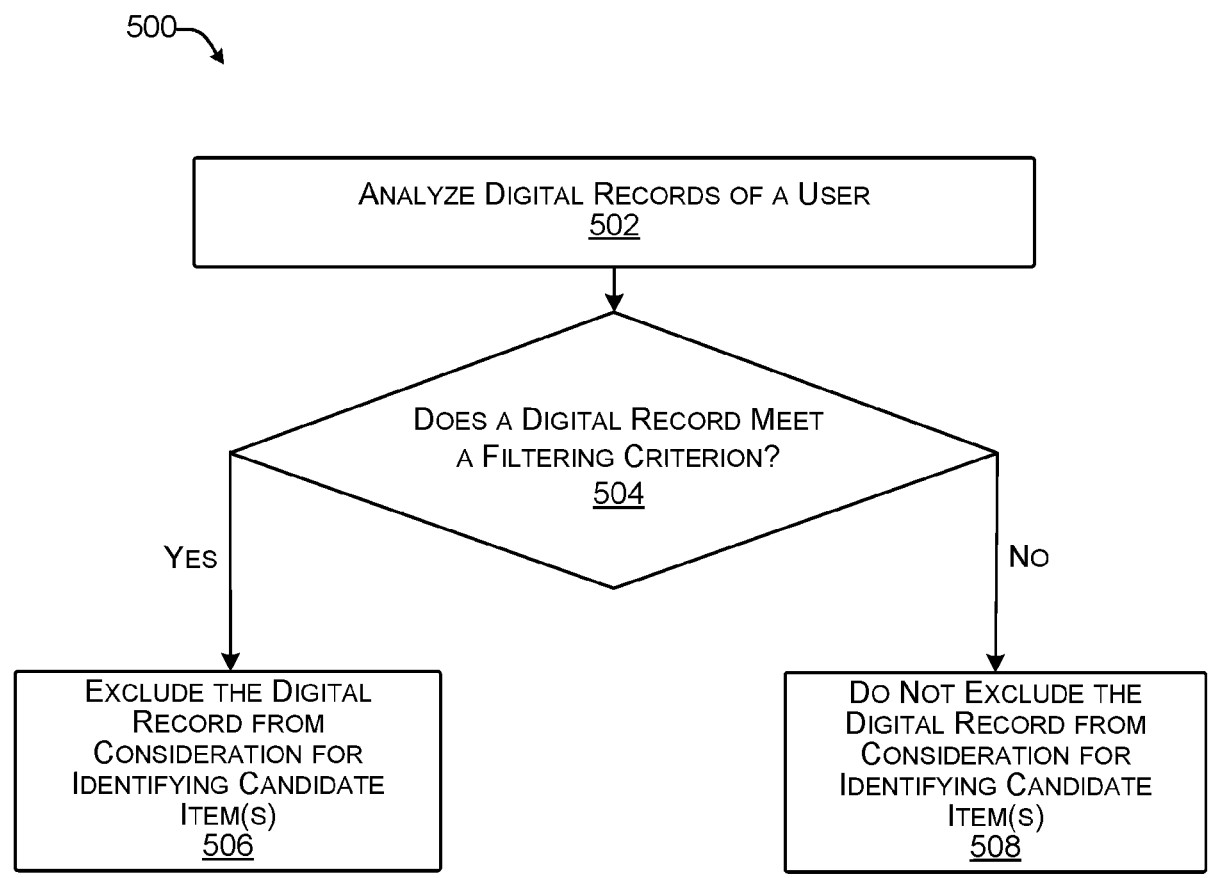
FIG. 5 illustrates an example process for excluding digital record(s) associated with item(s) that are perishable, personal, and/or gifted from consideration for identifying candidate items.

FIG. 5 illustrates an example process 500 for excluding digital record(s) associated with item(s) that are perishable, personal, and/or gifted from consideration for identifying candidate items.

Block 502 illustrates analyzing digital records of a user. As described above, the item selection module 114 can access digital records of users to identify item(s) that are candidates for resale to other users. As described above, digital records can include digital records associated with transactions processed by the service provider and/or digital records associated with emails, text messages, social media posts, peer-to-peer payment transactions, and the like. In at least one example, the item selection module 114 can parse individual of the digital records to extract information associated with previously purchased items, for example using natural language processing, image recognition, and the like. Such information can include prices paid for the items, item characteristic(s) (e.g., size, condition, color, age, manufacturer/brand, etc.), seller characteristics (whether the original seller processes payment transactions through the server(s) 102), an identifier of the item, an item description, and so forth.

As described above, in some examples, the item selection module 114 can analyze digital records of transactions processed by the service provider. In additional or alternative examples, the item selection module 114 can analyze digital records of transactions processed by entities other than the service provider. For example, the service provider can expose functionality and/or services via one or more APIs 120, thereby enabling functionality and/or services described herein to be integrated into various functional components of the environment 100. That is, in at least one example, service providers providing a conduit for enabling users to access digital records (e.g., via functional components for accessing email services, messaging services, social media services, peer-to-peer payment services, etc., as described herein) can integrate functionality associated with the item selection module 114 into their own functional components providing email user interfaces, messaging user interfaces, social media user interfaces, peer-to-peer payment user interfaces, etc. In such examples, the item selection module 114 can analyze digital records associated with transactions processed by the service provider and/or third-party entities.

Block 504 illustrates determining whether a digital record meets a filtering criterion. In at least one example, the item selection module 114 can analyze information parsed from the digital records and can identify or filter items meet a filtering criterion. In at least one example, the item selection module 114 can filter a digital record associated with an item that is perishable, personal, or gifted. Other filtering criteria include, but are not limited to, items with prohibitively expensive shipping fees, items with expiration dates, items that are not allowed to be sold in a certain territory and so on. In some instances, the user may set filtering criterion to prevent from some items being selected for potential sale. In some instances, the service provider may set the filtering criterion dynamically based on characteristics of the user, buyer, location, and the like.

In at least one example, the item selection module 114 can analyze information parsed from the digital records and can identify and/or filter items that are perishable, personal (e.g., an item that is for the use of the user and not appropriate for consumption by another user), and/or gifted (e.g., as indicated by a request for a gift receipt or other indication that the item is being purchased as a gift). In some examples, the item selection module 114 can utilize a machine-trained model to determine whether an item is perishable, personal, and/or gifted, or otherwise meets a filtering criterion. In additional or alternative examples, information parsed from the digital records can include words or other indications that an item is perishable, personal, and/or gifted or otherwise meets a filtering criterion. For example, an item description associated with a produce order can indicate that the produce is perishable, or a user may select a "gift" option during check out of an item such that the digital record indicates that the item was a gift.

Block 506 illustrates excluding the digital record from consideration for identifying candidate item(s). In at least one example, if a digital record is associated with an item that is perishable, personal (e.g., an item that is for the use of the user and not appropriate for consumption by another user), and/or gifted (e.g., as indicated by a request for a gift receipt or other indication that the item is being purchased as a gift), or otherwise meets a filtering criterion, the item selection module 114 can exclude at least a portion of the digital record from consideration. If such a digital record has more than one item and the other item(s) are not perishable, personal, and/or gifted, or do not otherwise meet a filtering criterion, the portion of the digital record corresponding to such a perishable item, a personal item, and/or a gifted item can be excluded from consideration for resale, but the other item(s) associated with the digital record can be considered for determining whether any of the other item(s) are resale candidates.

Block 508 illustrates refraining from excluding the digital record for consideration for identifying candidate item(s). In at least one example, if a digital record is not associated with an item that is perishable, personal (e.g., an item that is for the use of the user and not appropriate for consumption by another user), and/or gifted (e.g., as indicated by a request for a gift receipt or other indication that the item is being purchased as a gift), or does not otherwise meet a filtering criterion, the item selection module 114 can refrain from excluding the digital record from consideration and can determine whether any of the items associated with the digital record are associated with an interest level above a threshold, as described above with reference to FIG. 4.

In at least one example, in addition to, or as an alternative of, determining whether a digital record includes item(s) that are perishable, personal, and/or gifted, or otherwise meet a filtering criterion, the item selection module 114 can deprioritize and/or otherwise exclude digital records that are associated with any indication that an item is not likely to be a candidate for resale.

Figure 6:
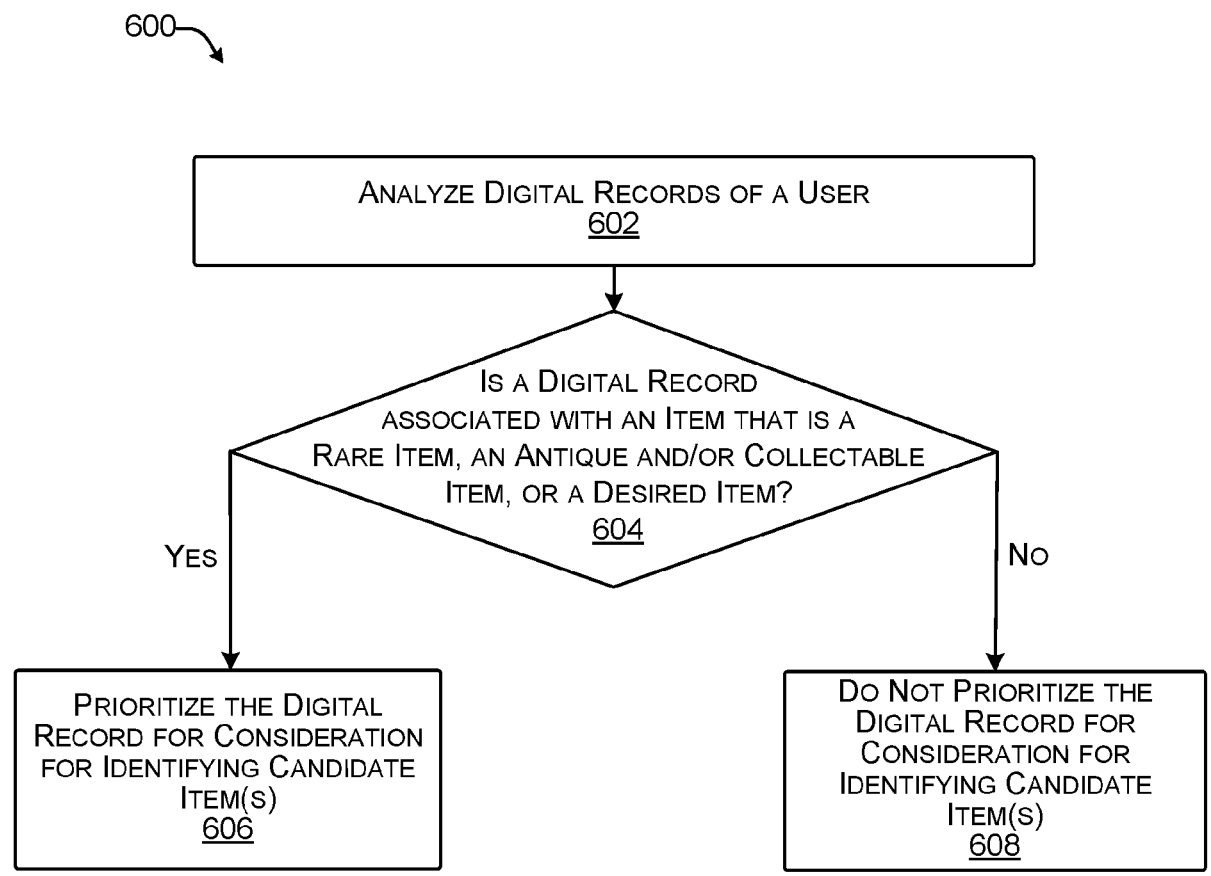
FIG. 6 illustrates an example process for prioritizing digital record(s) associated with item(s) that are rare, antique and/or collectable, and/or otherwise desired for consideration for identifying candidate items.

FIG. 6 illustrates an example process 600 for prioritizing digital record(s) associated with item(s) that are rare, antique and/or collectable, and/or otherwise desired for consideration for identifying candidate items.

Block 602 illustrates analyzing digital records of a user. As described above, the item selection module 114 can access digital records of users to identify item(s) that are candidates for resale to other users. As described above, digital records can include digital records associated with transactions processed by the service provider and/or digital records associated with emails, text messages, social media posts, peer-to-peer payment transactions, and the like. In at least one example, the item selection module 114 can parse individual of the digital records to extract information associated with previously purchased items, for example using natural language processing, image recognition, and the like. Such information can include prices paid for the items, item characteristic(s) (e.g., size, condition, color, age, manufacturer/brand, etc.), seller characteristics (whether the original seller processes payment transactions through the server(s) 102), an identifier of the item, an item description, and so forth.

As described above, in some examples, the item selection module 114 can analyze digital records of transactions processed by the service provider. In additional or alternative examples, the item selection module 114 can analyze digital records of transactions processed by entities other than the service provider. For example, the service provider can expose functionality and/or services via one or more APIs 120, thereby enabling functionality and/or services described herein to be integrated into various functional components of the environment 100. That is, in at least one example, service providers providing a conduit for enabling users to access digital records (e.g., via functional components for accessing email services, messaging services, social media services, peer-to-peer payment services, etc., as described herein) can integrate functionality associated with the item selection module 114 into their own functional components providing email user interfaces, messaging user interfaces, social media user interfaces, peer-to-peer payment user interfaces, etc. In such examples, the item selection module 114 can analyze digital records associated with transactions processed by the service provider and/or third-party entities.

Block 604 illustrates determining whether a digital record is associated with an item that is rare, antique and/or collectable, and/or a desired item. In at least one example, the item selection module 114 can analyze information parsed from the digital records and can identify items that are associated with a rare item (e.g., an item that has enhanced value because the demand exceeds the supply), an antique item and/or collectable item (e.g., an old item that carries certain nostalgic value and/or is of high quality), and/or a desired item (e.g., where user behavior indicates that the item—or items similar to the item—is requested, discussed, searched for, and/or purchased some number of times that meets or exceeds a threshold, at a frequency that meets or exceeds a threshold (or not), at a price that meets or exceeds threshold(s), etc.). In at least one example, such threshold(s) can be determined by a user and/or dynamically selected by the service provider based on characteristics of the user, buyer, location, and the like. In some examples, the item selection module 114 can utilize a machine-trained model to determine whether an item is rare, antique and/or collectable, and/or desired and/or to identify which items are more desirable than other items. In additional or alternative examples, information parsed from the digital records can include words or other indications that an item is rare, antique and/or collectable, and/or desired. For example, an item description associated with a digital record can indicate that an item is antique or from a particular year (thereby making it an antique).

Block 606 illustrates prioritizing the digital record for consideration for identifying candidate item(s). In at least one example, the item selection module 114 can prioritize digital records based at least in part on determining that such digital records are associated with a rare item (e.g., an item that has enhanced value because the demand exceeds the supply), an antique item and/or collectable item (e.g., an old item that carries certain nostalgic value and/or is of high quality), and/or a desired item (e.g., where user behavior indicates that the item—or items similar to the item—is requested, discussed, searched for, and/or purchased some number of times that meets or exceeds a threshold, at a frequency that meets or exceeds a threshold (or not), at a price that meets or exceeds threshold(s), etc.). In some examples, if such a digital record has more than one item and the other item(s) are not rare, antique and/or collectable, desired, etc., the portion of the digital record corresponding to item(s) that are rare, antique and/or collectable, desired, etc. can be prioritized for considering whether item(s) are resale candidates, but the other item(s) associated with the digital record may not be prioritized for determining whether any of the other item(s) are resale candidates.

Block 608 illustrates refraining from prioritizing the digital record for consideration for identifying candidate items. In at least one example, if a digital record is not associated with an item that is a rare item (e.g., an item that has enhanced value because the demand exceeds the supply), an antique item and/or collectable item (e.g., an old item that carries certain nostalgic value and/or is of high quality), and/or a desired item (e.g., where user behavior indicates that the item—or items similar to the item—is requested, discussed, searched for, and/or purchased some number of times that meets or exceeds a threshold, at a frequency that meets or exceeds a threshold (or not), at a price that meets or exceeds threshold(s), etc.), the item selection module 114 can refrain from prioritizing the digital record from consideration and can determine whether any of the items associated with the digital record are associated with an interest level above a threshold, as described above with reference to FIG. 4.

In at least one example, in addition to, or as an alternative of, determining whether a digital record includes item(s) that are rare, antique and/or collectable, and/or desired, the item selection module 114 can prioritize and/or promote digital records that are associated with any indication that an item is likely to be a candidate for resale.

Figure 7:
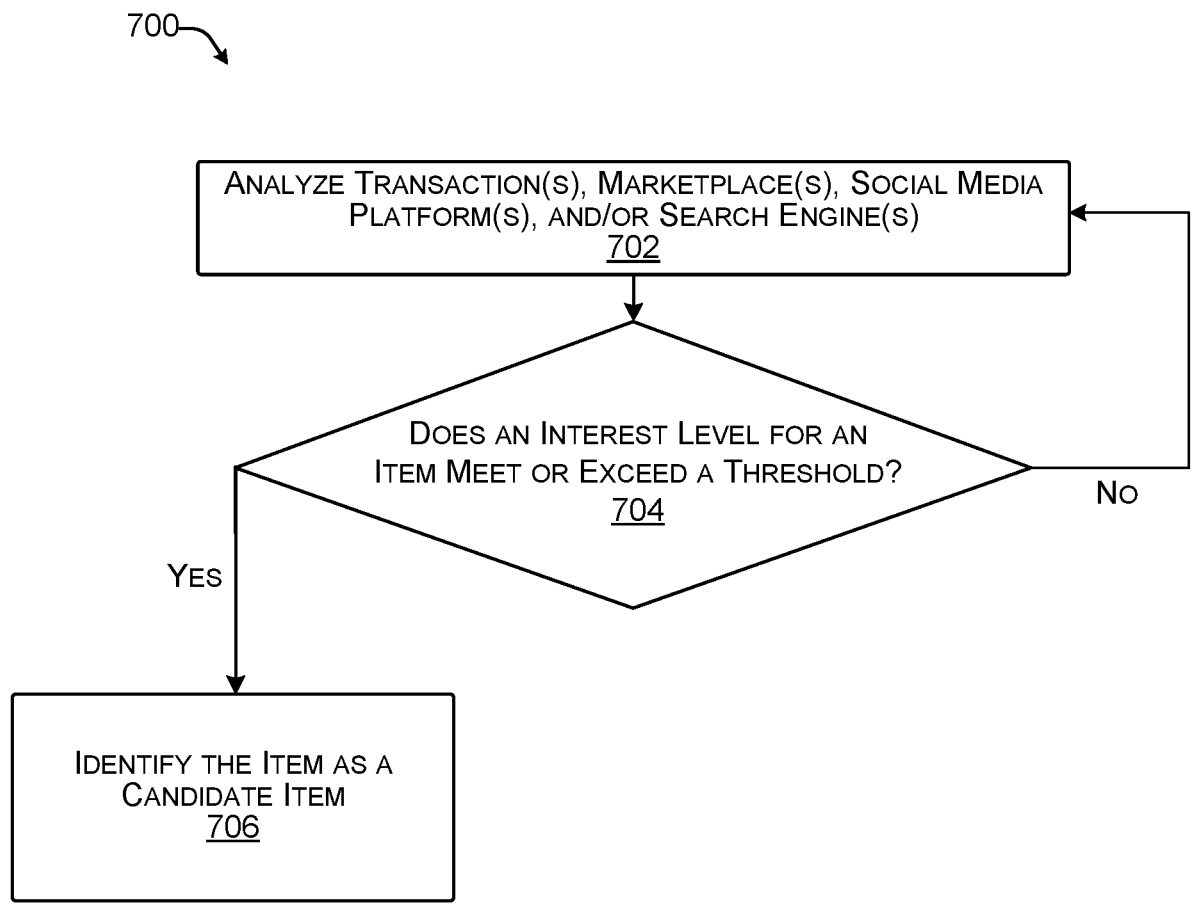
FIG. 7 illustrates an example process for identifying candidate item(s) based at least in part on interest level(s) determined based on analyzing transaction(s), marketplace(s), social media platform(s), and/or search engine(s).

FIG. 7 illustrates an example process 700 for identifying candidate item(s) based at least in part on interest level(s) determined based on analyzing transaction(s), marketplace(s), social media platform(s), and/or search engine(s). For example, process 700 can determine interest by further determining specific interests of the buyers, e.g., through wish lists and popular searches, identifying frequently purchased products or items buyers have currently bid on, monitoring the interactions, such as comments or "likes," on social media platforms.

Block 702 illustrates analyzing transaction(s), marketplace(s), social media platform(s), and/or search engine(s). In at least one example, the item selection module 114 can monitor transaction data of transactions processed by the payment processing module 118 to determine a level of interest associated with particular items. In additional or alternative examples, the item selection module 114 can access third-party server(s) 122, which can be associated with marketplace(s), social media platform(s), search engine(s), etc., to determine a level of interest associated with particular items.

Block 704 illustrates determining whether an interest level for an item meets or exceeds a threshold. In at least one example, the item selection module 114 can monitor transaction(s), marketplace(s), social media platform(s), search engine(s), etc., to determine a level of interest associated with an item. For instance, the item selection module 114 can monitor transaction(s), marketplace(s), social media platform(s), search engine(s), etc., to identify when user behavior indicates that the item—or items similar to the item—is requested, discussed, searched for, and/or purchased some number of times that meets or exceeds a threshold, at a frequency that meets or exceeds a threshold (or not), at a price that meets or exceeds threshold(s), etc. Such information can be used to determine levels of interest associated with items. Examples of determining levels of interest and/or whether a level of interest meets or exceeds a threshold are provided below.

In at least one example, a level of interest can be based on a frequency with which users request, discuss, search for, and/or purchase an item (e.g., other instances thereof) and/or items similar to the item. For example, if users of a marketplace request and/or purchase a particular item at a frequency that meets or exceeds a threshold, the item selection module 114 can determine that a level of interest meets or exceeds a threshold such that the item is "desired" or otherwise in demand. Additionally or alternatively, if users of a social media platform discuss (e.g., via social media posts, actions (e.g., likes, etc.), etc.) and/or purchase a particular item at a frequency that meets or exceeds a threshold, the item selection module 114 can determine that a level of interest meets or exceeds a threshold such that the item is "desired" or otherwise in demand. Furthermore, if users of a search engine search for a particular item at a frequency that meets or exceeds a threshold, the item selection module 114 can determine that a level of interest meets or exceeds a threshold such that the item is "desired" or otherwise in demand.

Additionally or alternatively, if users of a payment processing service associated with the service provider buy or sell a particular item at a frequency that meets or exceeds a threshold, the item selection module 114 can determine that a level of interest meets or exceeds a threshold such that the item is "desired" or otherwise in demand. In an alternative example, if users of a payment processing service buy or sell a particular item at a frequency that is less than another threshold that is below the threshold mentioned above (e.g., indicating that the item does not come up for sale frequently), the item selection module 114 can determine that a level of interest meets or exceeds a threshold such that the item is "desired" or otherwise in demand.

In some examples, the item selection module 114 can determine that an item has sold at a price that meets or exceeds a threshold. In such an example, the item selection module 114 can determine that a level of interest meets or exceeds a threshold such that the item is "desired" or otherwise in demand. In some examples, the item selection module 114 can determine that an item has sold at a price that is more than a threshold above a price for which the owner/seller 110 previously purchased the item. In such examples, the item selection module 114 can determine that a level of interest meets or exceeds a threshold such that the item is "desired" or otherwise in demand.

While reference is made to a frequency at which an item is requested, discussed, searched for, purchased, etc., a number of times an item is requested, discussed, searched for, purchased, etc., a price at which an item is sold, etc. in additional or alternative examples, such metrics can be determined for other identical instances of the item or items that are similar to the item (e.g., items associated with similarity scores that meet or exceed a similarity threshold).

Furthermore, in at least one example, a machine-trained model can be used to determine a score, or other indication, of a level of interest based on monitoring transaction(s) processed by the payment processing module 118, user activity on marketplace(s), social media platform(s), search engine(s), etc., etc. For example, the machine-trained model can generate a score based at least in part on user behavior indicating that the item—or items similar to the item—is requested, discussed, searched for, and/or purchased some number of times that meets or exceeds a threshold, at a frequency that meets or exceeds a threshold (or not), at a price that meet or exceed threshold(s), etc. In some examples, certain user behaviors can be weighted more than others for determining the score and such weighting can be dynamically updated as the machine-trained model is updated and/or trained overtime. Additional details associated with training such a machine-trained model are described below with reference to FIG. 13.

As described above, the item selection module 114 can determine a level of interest associated with an item and can compare the level of interest with a threshold to determine whether the level of interest meets or exceeds a threshold. In at least one example, the item selection module 114 can identify the item as a candidate for resale, as illustrated in block 706, based at least in part on determining that the level of interest meets or exceeds the threshold.

As described above, in at least one example, one or more other factors can be considered in determining whether an item is a candidate item for resale. For example, in some examples, volume and/or availability can be considered in determining whether an item is a candidate for resale. In an example, if three widgets are in demand and two are available for sale, the item selection module 114 can analyze digital records to determine whether there is another widget that can be offered for sale (e.g., to satisfy the demand). Moreover, the length of time a seller has owned or otherwise possessed an item can be a factor considered in determining whether an item is a candidate item for resale. For example, if a seller has owned an item for a period of time (which can be gleaned from analyzing digital records), the item selection module 114 can determine that the item is a candidate item for resale. In some examples, the period of time can be based on a version of the item (e.g., a watch, a phone, etc.). In other examples, the period of time can be determined dynamically based on characteristics of the user, buyer, location, and the like. In some examples, these factor(s) can be considered in view of interest or individually.

In some examples, the service provider, or another central processor, can aggregate items in a central repository for subsequent sale. In such an example, the item selection module 114 can identify items that are available for sale, in some examples, without regard to whether there is a current demand (and/or the interest level meets or exceeds a threshold) and can purchase them from sellers over time. The items can be subsequently listed for sale.

Figure 8:
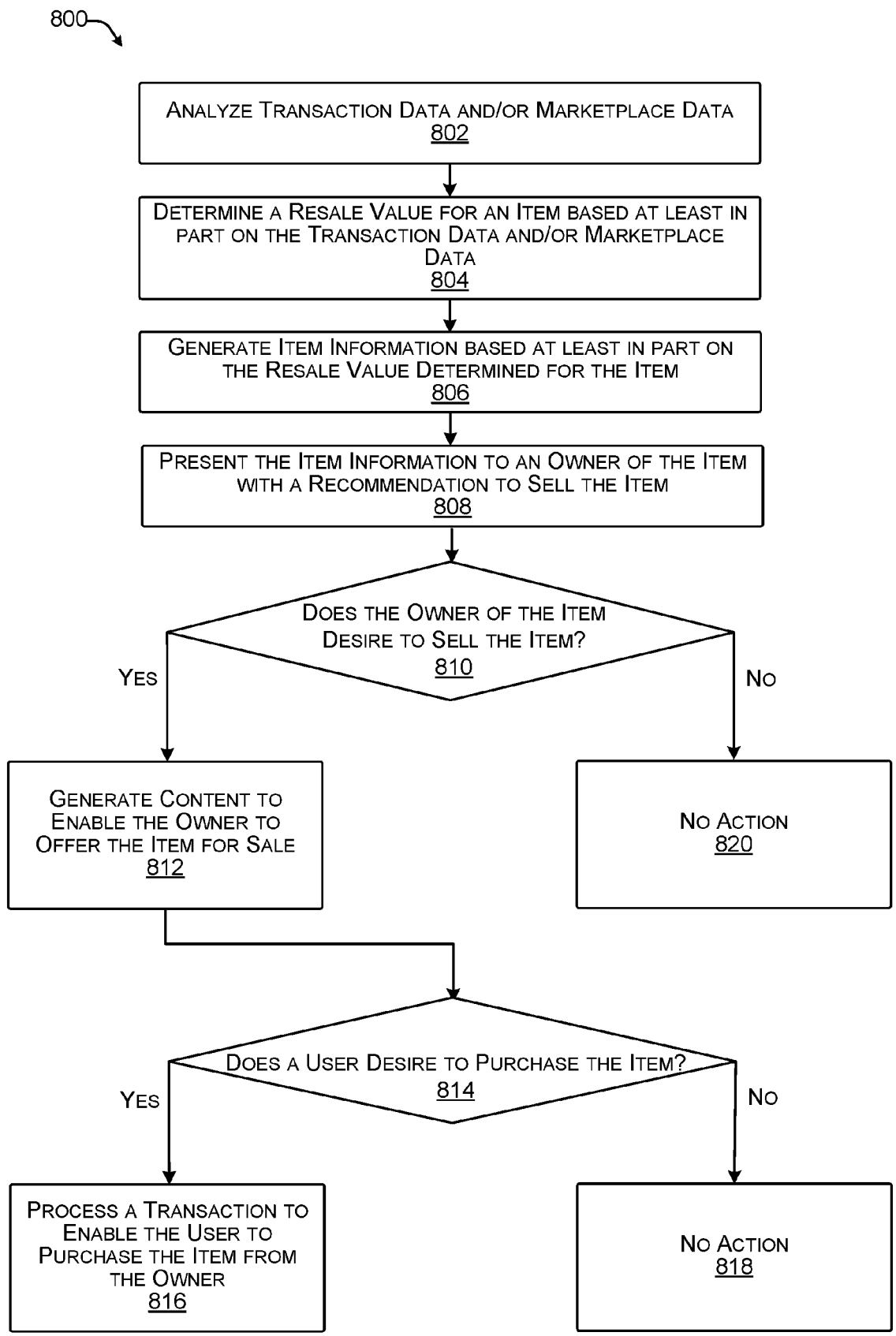
FIG. 8 illustrates an example process for determining a resale value for an item and/or processing a transaction for the item.

FIG. 8 illustrates an example process 800 for determining a resale value for an item and/or processing a transaction for the item.

Block 802 illustrates analyzing transaction data and/or marketplace data. In at least one example, the item information module 116 can monitor transaction data (e.g., associated with transaction(s) processed by the server(s) 102) and/or marketplace(s) associated with the third-party server(s) 122 to determine amounts for which the item (e.g., other instances thereof) and/or item(s) similar to the item are being sold and/or are being purchased.

Block 804 illustrates determining a resale value for an item based at least in part on the transaction data and/or the marketplace data. In at least one example, the item information module 116 can determine a recommended resale value based at least in part on the amounts observed from the transaction data and/or marketplace data. In some examples, the item information module 116 can access information associated with the other instance(s) of the item and/or item(s) similar to the item, such as condition, size, etc. and can determine the recommended resale value based on such information. In some examples, the item information module 116 can determine a recommended resale value based at least in part on a geolocation associated with the owner/seller or target buyers, preferences of the target buyers, durability of the item, length of ownership of the item, number of owners of the item, use(s) of the item, a season, a date, a time, etc., as described above.

Block 806 illustrates generating item information based at least in part on the resale value determined for the item. The item information module 116 can determine item information for individual items. In at least one example, such item information can include a recommended resale value of an item, a characteristic of the item, an identifier of the item, and so on. In at least one example, the item information module 116 can determine at least one of a characteristic of an item, an identifier of an item, etc. Characteristic(s) can include a size of an item, a condition of an item, a color of an item, an age of an item, a manufacturer/brand of an item, etc. In some examples, an identifier can comprise a SKU, a UPC, etc. In at least one example, the item information module 116 can parse digital records to access such information. That is, in at least one example, the item information module 116 can access a description of an item, an image, etc. from a digital record associated therewith. Additionally or alternatively, the item information module 116 can access a product catalog that stores product information (e.g., maintained by the server(s) 102) to access item information. In some examples, if a digital record and/or product catalog does not include information associated with an item, the item information module 116 can access content available via the third-party server(s) 122 to determine item information.

In at least one example, the item information module 116 can generate item information for an individual item and can associate the item information with a record of the item that is stored in association with the server(s) 102. Such a record can be a catalog and/or inventory record that indicates whether an item is available for sale, has been sold, details associated with individual transactions, a current owner, etc.

Block 808 illustrates presenting the item information to an owner of the item with a recommendation to sell the item. In at least one example, responsive to the item selection module 114 identifying an item as a candidate for resale and the item information module 116 determining item information associated with the item, the server(s) 102 can send a notification to the owner/seller device 104 that identifies the item as a candidate for resale and includes at least a portion of the item information. Such a notification can be transmitted to the owner/seller device 104 as an email, a text message, a push notification, etc.

Block 810 illustrates determining whether the owner of the item desires to sell the item. In at least one example, the notification can include an actuation mechanism to enable the owner/seller 110 to indicate whether they desire to sell the item. In at least one example, responsive to the owner/seller 110 responding to the notification with an indication that the owner/seller 110 desires to list the item for sale, the content generation module 117 can generate content that the owner/seller 110 can publish via one or more ecommerce channels to list the item for sale, as illustrated in block 812. If the owner/seller 110 indicates that they do not desire to sell the item and/or fails to respond to the notification within a predetermined period of time, the server(s) 102 can refrain from taking any action.

Block 814 illustrates determining whether a user desires to purchase the item. After the owner/seller 110 publishes the content via the one or more ecommerce channels, the users 112 can access the content, for example via a user interface associated with an online store, a marketplace, an email service provider, a social media platform, etc. In at least one example, responsive to a user (e.g., a buyer) actuating an actuation mechanism associated with the content or otherwise providing an indication of a desire to purchase the item, the server(s) 102 can process a transaction to enable the user (e.g., buyer) to purchase the item from the owner, as illustrated in block 816.

In some examples, the payment processing module 118 can store payment data associated with users. In at least one example, the payment processing module 118 can determine an identity of the user and can determine whether the payment processing module 118 stores payment data associated with the user. If the payment processing module 118 stores payment data associated with the user, the payment processing module 118 can process a transaction for the item based at least in part on the stored payment data. Otherwise, the payment processing module 118 can prompt the user to provide payment data for processing the transaction. The payment processing module 118 can then process a transaction for the cost of the item using the payment data. In at least one example, the payment processing module 118 can utilize at least a portion of the item information (e.g., cost) for processing the transaction.

In at least one example, the payment processing module 118 can facilitate the transfer of funds from the buyer to the owner/seller 110 and the item from the owner/seller 110 to the buyer. In some examples, the payment processing module 118 can withhold a portion of cost of the transaction from the owner/seller 110 (e.g., as a fee for facilitating the sale). The portion can be based on the cost of the transaction, a fixed fee, etc.

If a user does not desire to purchase the item, the payment processing module 118 can refrain from taking any action, as illustrated in block 818.

Figure 9:
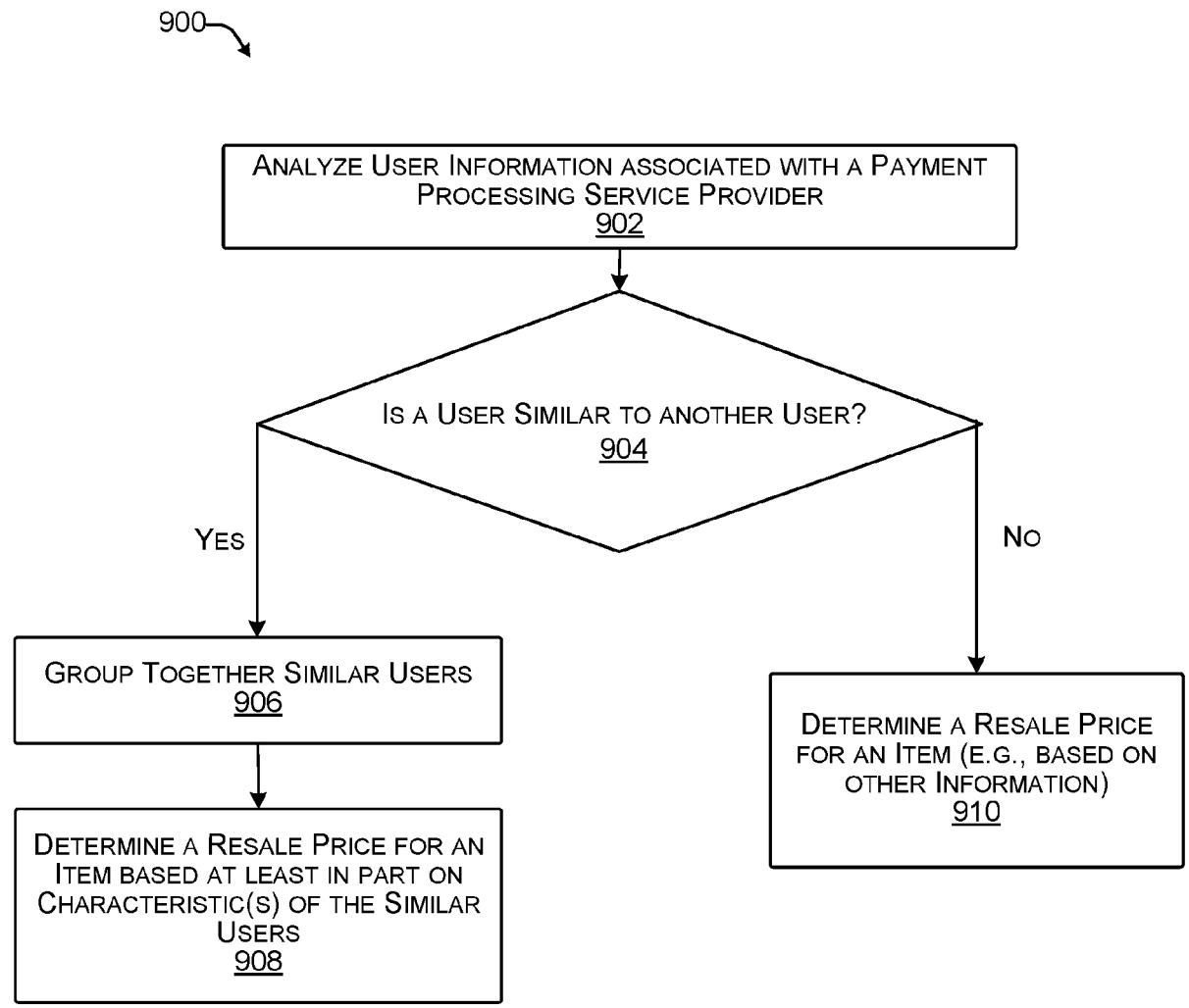
FIG. 9 illustrates an example process for determining a resale value for an item based at least in part on characteristic(s) of similar users.

FIG. 9 illustrates an example process 900 for determining a resale value for an item based at least in part on characteristic(s) of similar users.

Block 902 illustrates analyzing user information associated with a service provider. In at least one example, the service provider can store data associated with users of the service provider. In some examples, such data can be stored in profiles and can include demographic data, transaction data (e.g., of transactions processed by the server(s) 102), digital records, etc. Additional details associated with information stored in the profiles is described below with reference to FIG. 13.

Block 904 illustrates determining whether a user is similar to another user. In at least one example, the item information module 116 can analyze user information to identify one or more users that are similar to the owner of an item. In some examples, the item information module 116 can utilize a machine-trained model to determine a similarity score (or other metric) between two users. If the similarity score meets or exceeds a threshold, the users can be determined to be similar to one another. In at least one example, user(s) may be associated with a same geolocation, purchase the same or similar item(s) from the same or similar sellers(s), spend approximately the same amount (e.g., or range) on transactions, have the same or similar sizing, share one or more preferences, have similar buying or selling history, etc. Details associated with training such a machine-trained model are described below with reference to FIG. 13.

Block 906 illustrates grouping together similar users. Based at least in part on determining that two or more users are similar to one another, the item information module 116 can group the users together. That is, the group of similar users can be a subset of all of the users of the service provider. In at least one example, a group of similar users can be determined to be target buyers for particular items.

Block 908 illustrates determining a resale value for an item based at least in part on characteristic(s) of the similar users. In some examples, the item information module 116 can determine a recommended resale value based at least in part on a geolocation associated with the owner/seller 110 or target buyers, preferences of the target buyers, durability of the item, length of ownership of the item, number of owners of the item, use(s) of the item, a season, a date, a time, etc. In an example the group of similar users are the target buyers, the item information module 116 can determine a resale value based at least in part on the group of similar users. For example, in at least one example, the resale value can be based on what the group of similar users is predicted to pay for the item or what users in the group of similar users have previously paid for the item (and/or item(s) similar to the item).

In at least one example, users identified as being similar to an owner/seller 110 can be target buyers, as described above. In such an example, the server(s) 102 can send a notification to such target buyers, notifying them that an item is available for sale and/or offering the item for sale. In some examples, such a notification can be provided via email, text message, push notification, publication via a marketplace and/or social media platform, etc. The notification can include at least a portion of the item information. In some examples, as described above with reference to FIG. 2B, the notification can include an actuation mechanism which enables the target buyers to purchase the item associated with the notification by interacting with the notification.

Block 910 illustrates determining a resale price for an item (e.g., based on other information. In at least one example, if there are no similar users, the item information module 116 can determine a recommended resale value based at least in part on additional or alternative information. For example, the item information module 116 can determine a recommended resale value based at least in part on what the owner/seller 110 originally paid. Furthermore, in some examples, the item information module 116 can determine the item information module 116 based at least in part on a geolocation associated with the owner/seller 110 or target buyers, preferences of the target buyers, durability of the item, length of ownership of the item, number of owners of the item, use(s) of the item, a season, a date, a time, etc.

Figure 10:
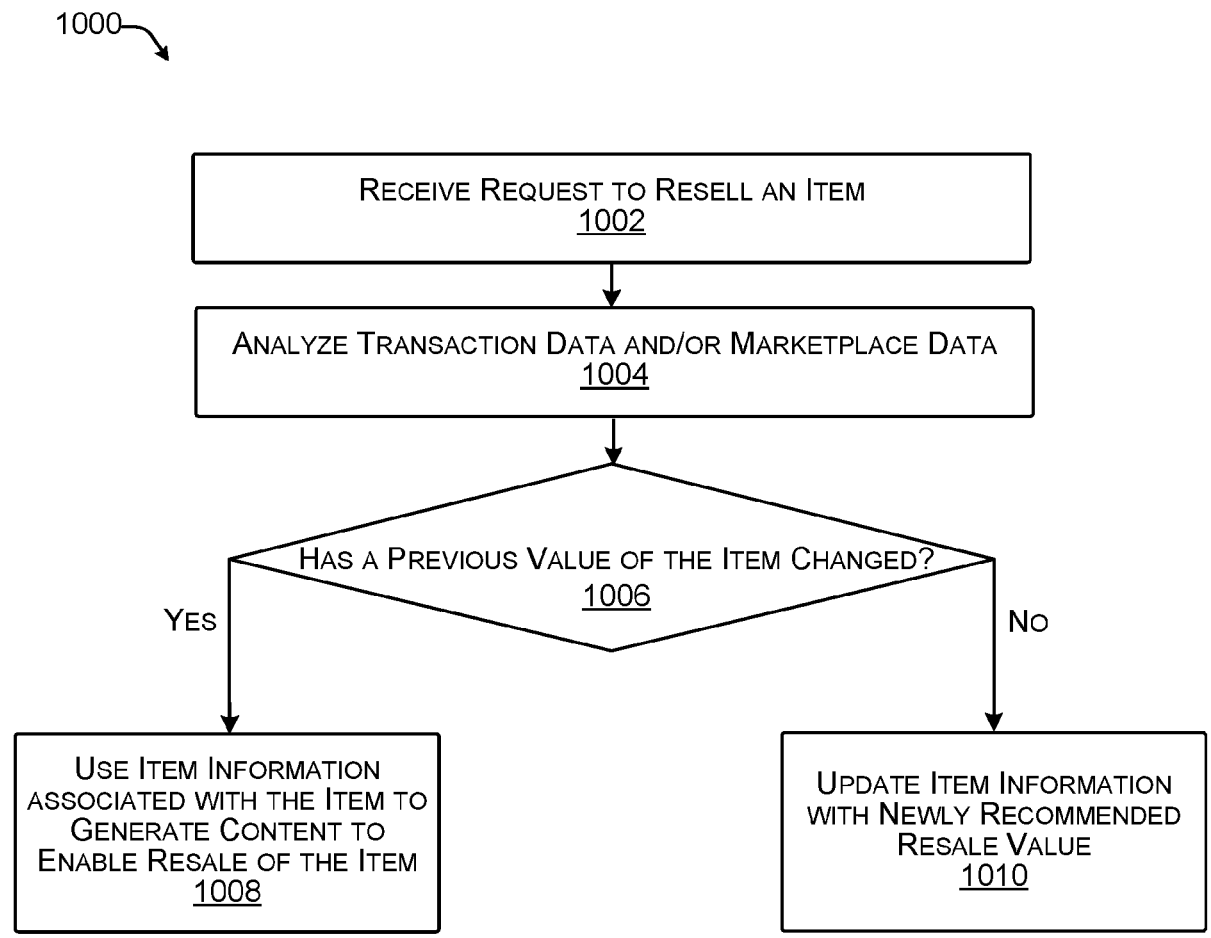
FIG. 10 illustrates an example process for updating a resale value of a previously sold item.

FIG. 10 illustrates an example process 1000 for updating a resale value of a previously sold item.

Block 1002 illustrates receiving a request to resell an item. In at least one example, the item information module 116 can receive a request to resell an item. As described above, in some examples, such a request can be received responsive to an interaction with a GUI that enables users to manage item(s) purchased, item(s) sold, and/or item(s) that are currently listed for sale. In at least one example, the request can be associated with an identifier, or additional or alternative item information, to identify the item to which the request corresponds. Responsive to receiving the request and identifying the item associated with the request, the item information module 116 can access the catalog and/or inventory record associated with the item and the associated item information.

Block 1004 illustrates analyzing transaction data and/or marketplace data. In at least one example, the item information module 116 can monitor transaction data (e.g., associated with transaction(s) processed by the server(s) 102) and/or marketplace data (e.g., associated with marketplace(s) associated with the third-party server(s) 122) to determine amounts for which the item (e.g., other instances thereof) and/or item(s) similar to the item are being sold and/or are being purchased.

Block 1006 illustrates determining whether a previous value of the item has changed. In at least one example, the item information module 116 can determine a resale value of the item based at least in part on the transaction data and/or marketplace data. In some examples, the resale value can be different than the previous sales price. Based at least in part on determining that the previous vale of the item has not changed (e.g., the resale value is the same as the previous sales price), the previous item information can be used to generate a content item to enable resale of the item, as illustrated in block 1008. Generating the content can include offering to host the item on a third-party system for re-sale without seller intervention. In some examples, generating the content translates to pre-populating the forms on the ecommerce channel with information extracted from the digital records. In other examples, generating the content means creating a refund link so that the same merchant can accept refunds and re-sell the item. However, if the previous value has changed (e.g., the resale value has increased or decreased), the item information module 116 can update the item information with the newly recommended resale value, as illustrated in block 1010. Based at least in part on updating the item information, the content generation module 117 can generate new content based on updated item information. Additionally, in some examples, the item information module 116 can send an indication of the updated item information to a user interface associated with a computing device (e.g., user interface 124) and the user interface can update a GUI presented via the user interface. Additional details associated with such an update are described above with reference to FIG. 3.

Figure 11:
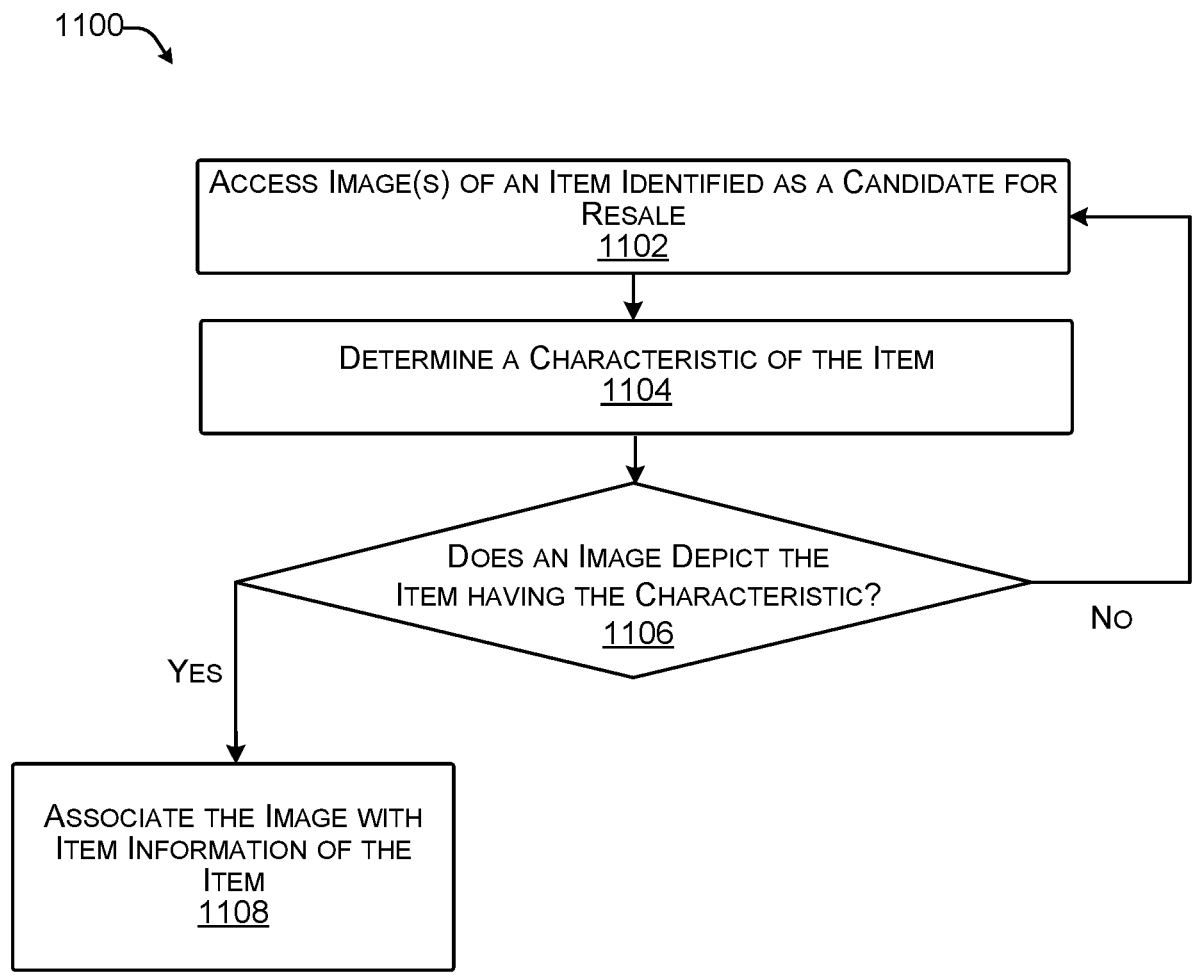
FIG. 11 illustrates an example process for associating an image with item information of an item.

FIG. 11 illustrates an example process 1100 for associating an image with item information of an item.

Block 1102 illustrates accessing image(s) of an item identified as a candidate for resale. In at least one example, the item information module 116 can access image(s) of items. In some examples, users can upload images of items. In additional or alternative examples, digital records of items can be associated with images. Further, in some examples, the item information module 116 can access content available via the third-party server(s) 122 to access images of items. In at least one example, the item information module 116 can access images of an item that has been identified as a candidate for resale.

Block 1104 illustrates determining a characteristic of the item. As described above, in at least one example, the item information module 116 can determine at least one of a characteristic of an item, an identifier of an item, etc. Characteristic(s) can include a size of an item, a condition of an item, a color of an item, an age of an item, a manufacturer/brand of an item, etc. In some examples, an identifier can comprise a Characteristic(s) can include a size of an item, a condition of an item, a color of an item, an age of an item, a manufacturer/brand of an item, etc. In some examples, an identifier can comprise a SKU, a UPC, etc. In at least one example, the item information module 116 can parse digital records to access such information. That is, in at least one example, the item information module 116 can access a description of an item, an image, etc. from a digital record associated therewith. Additionally or alternatively, the item information module 116 can access a product catalog that stores product information (e.g., maintained by the server(s) 102) to access item information. In some examples, if a digital record and/or product catalog does not include information associated with an item, the item information module 116 can access content available via the third-party server(s) 122 to determine item information.

Block 1106 illustrates determining whether the image depicts the item having the characteristic. In at least one example, the item information module 116 can analyze the image(s) to determine whether any of the image(s) depict the item having the characteristic. For instance, if an item is a particular color, the item information module 116 can identify an image that depicts the item in the particular color. Or, if the item is a particular size, the item information module 116 can identify an image that depicts the item in the particular color.

Block 1108 illustrates associating the image with item information of the item. Based at least in part on determining that an image depicts the item having the characteristic, the item information module 116 can associate the image with the item information of the image. As such, the image can be used in generating content (e.g., by the content generation module 117) that enables the owner/seller 110 of the item to list the item for sale.

If none of the image(s) depict the item having the characteristic, process 1100 can return to block 1102 and the item information module 116 can continue to access image(s) of the item (e.g., in an effort to identify an image that depicts the item having the characteristic).

In some examples, the content generation module 117 can perform one or more image processing techniques to generate a representation of an item that represents a size, fit, or other characteristic of the item, for example, if an image depicting the item having a particular characteristic is not available. For instance, the content generation module 117 can generate a composite image of an item such that a representation of the item is superimposed or otherwise placed in association with a user having a same or similar size or dimension as the owner/seller 110, user, etc. Or, the content generation module 117 can modify an image of an item to represent another characteristic (e.g., color, condition, etc.).

Figure 12:
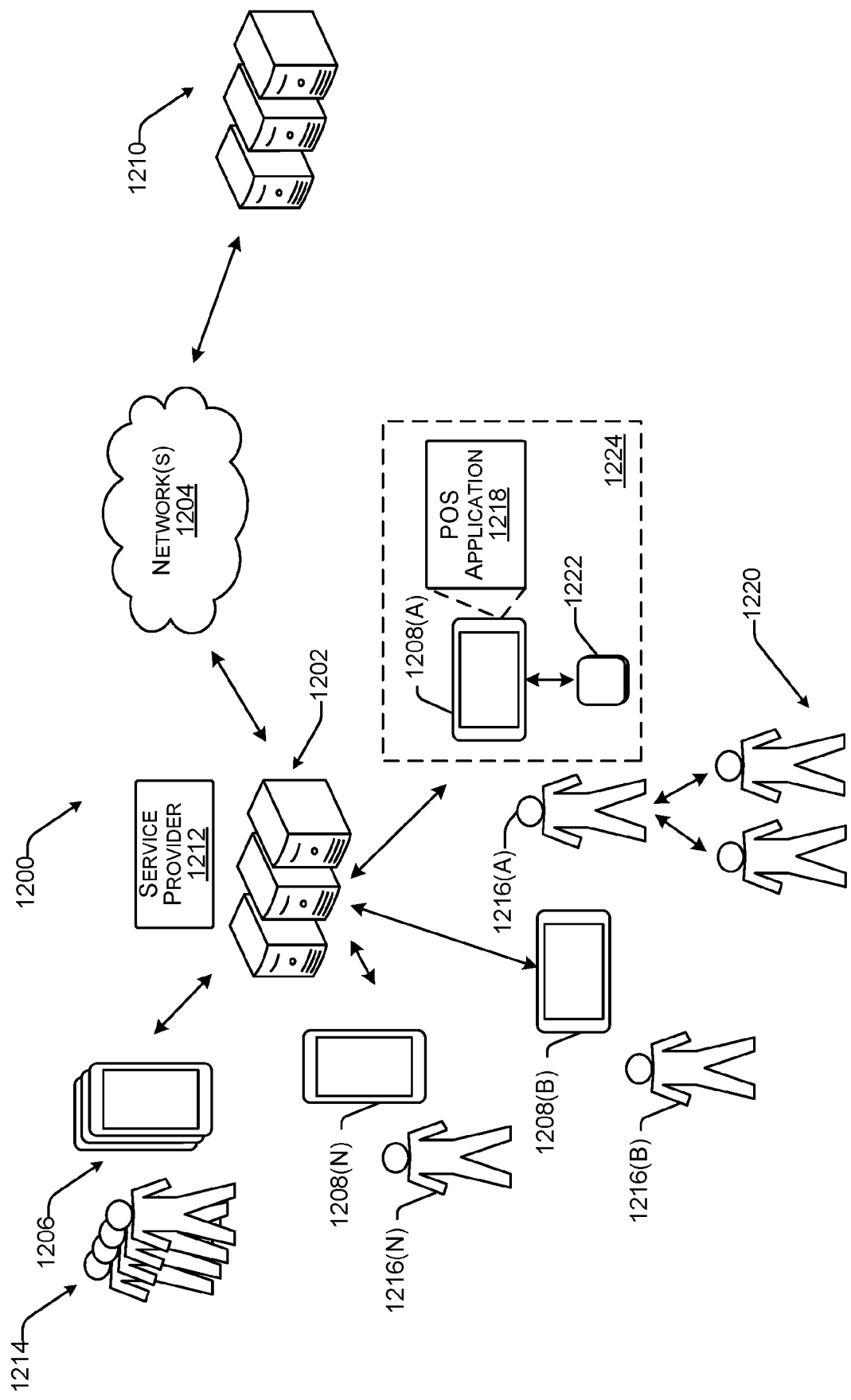
FIG. 12 illustrates an example seller ecosystem for facilitating, among other things, techniques described herein.

FIG. 12 illustrates an example environment 1200. The environment 1200 includes server computing device(s) 1202 that can communicate over a network 1204 with user devices 1206 (which, in some examples can be seller devices 1208 (individually, 1208(A)-1208(N))) and/or server computing device(s) 1210 associated with third-party service provider(s). The server computing device(s) 1202 can be associated with a service provider 1212 that can provide one or more services for the benefit of users 1214, as described below. Actions attributed to the service provider 1212 can be performed by the server computing device(s) 1202.

In at least one example, entities described in FIG. 12 can correspond to entities described above with reference to FIG. 1. For example, the server computing device(s) 1202 can correspond to the server(s) 102, the user device 1206 can correspond to the owner/seller device 104 and/or the user device(s) 106, the server computing device(s) 1210 associated with third-party service provider(s) can correspond, at least in part, to the third-party server(s) 122, and the network(s) 1204 can correspond to the network(s) 108. In at least one example, the service provider 1212 can correspond to the service provider described above with reference to FIG. 1.

As described above, techniques described herein are directed to intelligently identifying items (e.g., goods, services, etc.) for sale or resale based on digital records of past purchases. In an example, a network-based merchant environment 1200, as illustrated in FIG. 12, can scan, or otherwise monitor, digital records including emails, text messages, social media posts, peer-to-peer payment transactions, and the like, to learn about past purchases of users. In at least one example, the components of the environment 1200 can parse the digital records to identify items purchased via transactions and information associated with such items (e.g., price, characteristics, etc.). Components of the environment 1200 can identify an item as a candidate for resale to another user. Additionally, components of the environment 1200 can scan marketplaces (e.g., AMAZON®, ETSY®, EBAY®, etc.) to determine an amount for which the item (e.g., other instances thereof) and/or item(s) similar to the item is/are being sold. In at least one example, components of the environment 1200 can prompt the owner of the item to sell the item, by presenting the owner with information regarding the resale value of the item and/or a level of interest associated with the item. The owner of the item can opt to list the item for sale and the service provider 1212 can facilitate any resulting transaction. That is, components of the environment 1200 can identify items that are capable of being sold, based on factors such as market interest, profitability associated with resale, etc., and then create marketplaces for such items, even when the owner is not a traditional merchant. By converting purchased items into sellable items, the platforms described herein provide frictionless and structured ways to buy and sell.

Techniques described herein can utilize a network-based seller ecosystem, such as the environment 1200 described herein, to generate a marketplace for users that have previously purchased items to sell such items to other users. That is, techniques described here can leverage integrated functionality, provided by a service provider that can be remotely located from the end users having the integrated functionality, to monitor digital records of previous purchases and to turn such previous purchases into selling opportunities (e.g., inventory). The service provider 1212 can then leverage integrated services, such as inventory management, content generation, payment processing, and the like to facilitate transactions as described herein. Techniques described herein can be useful for streamlining the resale (and/or return) process by utilizing information provided in association with a previous purchase to generate item information, which can track the item via one or more transactions facilitated by the service provider 1212.

The environment 1200 can include a plurality of user devices 1206, as described above. Each one of the plurality of user devices 1206 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1214. The users 1214 can be referred to as buyers, customers, sellers, merchants, borrowers, employees, employers, payors, payees, couriers and so on. The users 1214 can interact with the user devices 1206 via user interfaces presented via the user devices 1206 (e.g., the user interface(s) 124 described above with reference to FIG. 1). In at least one example, a user interface can be presented via a web browser, or the like. In other examples, a user interface can be presented via an application, such as a mobile application or desktop application, which can be provided by the service provider 1212 or which can be an otherwise dedicated application. In some examples, individual of the user devices 1206 can have an instance or versioned instance of an application, which can be downloaded from an application store, for example, which can present the user interface(s) described herein. In at least one example, a user 1214 can interact with the user interface via touch input, spoken input, or any other type of input.

As described above, in at least one example, the users 1214 can include sellers 1216 (individually, 1216(A)-1216 (N)). In an example, the sellers 1216 can operate respective seller devices 1208, which can be user devices 1206 configured for use by sellers 1216. For the purpose of this discussion, a "seller" can be any entity that offers items (e.g., goods or services) for purchase or other means of acquisition (e.g., rent, borrow, barter, etc.). The sellers 1216 can offer items for purchase or other means of acquisition via brick-and-mortar stores, mobile stores (e.g., pop-up shops, food trucks, etc.), online stores, marketplaces, social media platforms, combinations of the foregoing, and so forth. In some examples, at least some of the sellers 1216 can be associated with a same entity but can have different seller locations and/or can have franchise/franchisee relationships. In additional or alternative examples, the sellers 1216 can be different sellers. That is, in at least one example, the seller 1216(A) is a different seller than the seller 1216(B) and/or the seller 1216(C).

For the purpose of this discussion, "different sellers" can refer to two or more unrelated sellers. "Different sellers" therefore can refer to two or more sellers that are different legal entities (e.g., natural persons and/or corporate persons) that do not share accounting, employees, branding, etc.

"Different sellers," as used herein, have different names, employer identification numbers (EIN)s, lines of business (in some examples), inventories (or at least portions thereof), and/or the like. Thus, the use of the term "different sellers" does not refer to a seller with various seller locations or franchise/franchisee relationships. Such sellers—with various seller locations or franchise/franchisee relationships—can be referred to as sellers having different seller locations and/or different commerce channels.

In some examples, a seller device 1208 can have an instance of a point-of-sale (POS) application 1218 stored thereon. The POS application 1218 can configure the seller device 1208 as a POS terminal, which enables the seller 1216(A) to interact with one or more buyers 1220. As described above, the users 1214 can include buyers, such as the buyers 1220 shown as interacting with the seller 1216(A). For the purpose of this discussion, a "buyer" can be any entity that acquires items from sellers. While only two buyers 1220 are illustrated in FIG. 12, any number of buyers 1220 can interact with the sellers 1216. Further, while FIG. 12 illustrates the buyers 1220 interacting with the seller 1216(A), the buyers 1220 can interact with any of the sellers 1216. Note, while the seller device 1208 is described herein as including a POS application 1218, in some examples, the seller device 1208 may not have a POS application 1218 and the seller device 1208 can access the payment processing services described herein via an additional or alternative user interface.

In at least one example, interactions between the buyers 1220 and the sellers 1216 that involve the exchange of funds (from the buyers 1220) for items (from the sellers 1216) can be referred to as "POS transactions" and/or "transactions." In at least one example, the POS application 1218 can determine transaction data associated with the POS transactions. Transaction data can include payment information, which can be obtained from a reader device 1222 associated with the seller device 1208(A), user authentication data, purchase amount information, point-of-purchase information (e.g., item(s) purchased, date of purchase, time of purchase, etc.), etc. The POS application 1218 can send transaction data to the server computing device(s) 1202. Furthermore, the POS application 1218 can present a user interface to enable the seller 1216(A) to interact with the POS application 1218 and/or the service provider 1212 via the POS application 1218.

In at least one example, the seller device 1208(A) can be a special-purpose computing device configured as a POS terminal (via the execution of the POS application 1218). In at least one example, the POS terminal may be connected to a reader device 1222, which is capable of accepting a variety of payment instruments, such as credit cards, debit cards, gift cards, short-range communication based payment instruments, and the like, as described below. In at least one example, the reader device 1222 can plug in to a port in the seller device 1208(A), such as a microphone port, a headphone port, an audio-jack, a data port, or other suitable port. In additional or alternative examples, the reader device 1222 can be coupled to the seller device 1208(A) via another wired or wireless connection, such as via a Bluetooth®, Bluetooth® low energy (BLE), and so on. Additional details are described below with reference to FIG. 13. In some examples, the reader device 1222 can read information from alternative payment instruments including, but not limited to, wristbands and the like.

In some examples, the reader device 1222 may physically interact with payment instruments such as magnetic stripe payment cards, EMV payment cards, and/or short-range communication (e.g., near field communication (NFC), radio frequency identification (RFID), Bluetooth®, BLE, etc.) payment instruments (e.g., cards or devices configured for tapping). The POS terminal may provide a rich user interface, communicate with the reader device 1222, and communicate with the server computing device(s) 1202, which can provide, among other services, a payment processing service. The server computing device(s) 1202 associated with the service provider 1212 can communicate with server computing device(s) 1210, as described below. In this manner, the POS terminal and reader device 1222 may collectively process transaction(s) between the sellers 1216 and buyers 1220. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to the buyers 1220. In additional or alternative examples, the POS terminal can have a display integrated therein for presenting information to the buyers 1220. POS systems, such as the POS system 1224, may be mobile, such that POS terminals and reader devices may process transactions in disparate locations across the world. POS systems can be used for processing card-present transactions and card-not-present (CNP) transactions, as described below.

A card-present transaction is a transaction where both a buyer 1220 and his or her payment instrument are physically present at the time of the transaction. Card-present transactions may be processed by swipes, dips, taps, or any other interaction between a physical payment instrument (e.g., a card), or otherwise present payment instrument, and a reader device 1222 whereby the reader device 1222 is able to obtain payment data from the payment instrument. A swipe is a card-present transaction where a buyer 1220 slides a card, or other payment instrument, having a magnetic strip through a reader device 1222 that captures payment data contained in the magnetic strip. A dip is a card-present transaction where a buyer 1220 inserts a payment instrument having an embedded microchip (i.e., chip) into a reader device 1222 first. The dipped payment instrument remains in the payment reader until the reader device 1222 prompts the buyer 1220 to remove the card, or other payment instrument. While the payment instrument is in the reader device 1222, the microchip can create a one-time code which is sent from the POS system 1224 to the server computing device(s) 1210 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a buyer 1220 may tap or hover his or her payment instrument (e.g., card, electronic device such as a smart phone running a payment application, etc.) over a reader device 1222 to complete a transaction via short-range communication (e.g., NFC, RFID, Bluetooth®, BLE, etc.). Short-range communication enables the payment instrument to exchange information with the reader device 1222. A tap may also be called a contactless payment.

A CNP transaction is a transaction where a card, or other payment instrument, is not physically present at the POS such that payment data is required to be manually keyed in (e.g., by a seller, buyer, etc.), or payment data is required to be recalled from a card-on-file data store, to complete the transaction. In some examples, transactions as described herein are CNP transactions such that the server(s) 102 can receive payment data (e.g., from user(s)/buyer(s) 112 via a secure portal that enables the user(s)/buyer(s) 112 to manually input payment data and/or an identifier to enable access to card-on-file data).

The POS system 1224, the server computing device(s) 1202, and/or the server computing device(s) 1210 may exchange payment information and transaction data to determine whether transactions are authorized. For example, the POS system 1224 may provide encrypted payment data, user authentication data, purchase amount information, point-of-purchase information, etc. (collectively, transaction data) to server computing device(s) 1202 over the network(s) 1204. The server computing device(s) 1202 may send the transaction data to the server computing device(s) 1210. As described above, in at least one example, the server computing device(s) 1210 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of sellers(s). An acquirer can be a registered member of a card association (e.g., Visa®, MasterCard®), and can be part of a card payment network. The acquirer (e.g., the server computing device(s) 1210 associated therewith) can send a fund transfer request to a server computing device of a card payment network (e.g., Mastercard®, VISA®, etc.) to determine whether the transaction is authorized or deficient. In at least one example, the service provider 1212 can serve as an acquirer and connect directly with the card payment network.

The card payment network (e.g., the server computing device(s) 1210 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1210 associated therewith) can make a determination as to whether the buyer has the capacity to absorb the relevant charge associated with the payment transaction. In at least one example, the service provider 1212 can serve as an issuer and/or can partner with an issuer. The transaction is either approved or rejected by the issuer and/or the card payment network (e.g., the server computing device(s) 1210 associated therewith), and a payment authorization message is communicated from the issuer to the POS device via a path opposite of that described above, or via an alternate path.

As described above, the server computing device(s) 1210, which can be associated with payment service provider(s), may determine whether the transaction is authorized based on the transaction data, as well as information relating to parties to the transaction (e.g., the buyer 1220 and/or the seller 1216(A)). The server computing device(s) 1210 may send an authorization notification over the network(s) 1204 to the server computing device(s) 1202, which may send the authorization notification to the POS system 1224 over the network(s) 1204 to indicate whether the transaction is authorized. The server computing device(s) 1202 may also transmit additional information such as transaction identifiers to the POS system 1224. In one example, the server computing device(s) 1202 may include a seller application and/or other functional components for communicating with the POS system 1224 and/or the server computing device(s) 1210 to authorize or decline transactions.

Based on the authentication notification that is received by the POS system 1224 from server computing device(s) 1202, the seller 1216(A) may indicate to the buyer 1220 whether the transaction has been approved. In some examples, approval may be indicated at the POS system 1224, for example, at a display of the POS system 1224. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1212 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1214 can access all of the services of the service provider 1212. In other examples, the users 1214 can have gradated access to the services, which can be based on risk tolerance, IDV outputs, subscriptions, and so on. In at least one example, access to such services can be availed to the sellers 1216 via the POS application 1218. In additional or alternative examples, each service can be associated with its own access point (e.g., application, web browser, etc.).

The service provider 1212 can offer payment processing services for processing payments on behalf of the sellers 1216, as described above. For example, the service provider 1212 can provision payment processing software, payment processing hardware and/or payment processing services to sellers 1216, as described above, to enable the sellers 1216 to receive payments from the buyers 1220 when conducting POS transactions with the buyers 1220. For instance, the service provider 1212 can enable the sellers 1216 to receive cash payments, payment card payments, and/or electronic payments from buyers 1220 for POS transactions and the service provider 1212 can process transactions on behalf of the sellers 1216.

As the service provider 1212 processes transactions on behalf of the sellers 1216, the service provider 1212 can maintain accounts or balances for the sellers 1216 in one or more ledgers. For example, the service provider 1212 can analyze transaction data received for a transaction to determine an amount of funds owed to a seller 1216(A) for the transaction. In at least one example, such an amount can be a total purchase price less fees charged by the service provider 1212 for providing the payment processing services. Based on determining the amount of funds owed to the seller 1216(A), the service provider 1212 can deposit funds into an account of the seller 1216(A). The account can have a stored balance, which can be managed by the service provider 1212. The account can be different from a conventional bank account at least because the stored balance is managed by a ledger of the service provider 1212 and the associated funds are accessible via various withdrawal channels including, but not limited to, scheduled deposit, same-day deposit, instant deposit, and a linked payment instrument.

A scheduled deposit can occur when the service provider 1212 transfers funds associated with a stored balance of the seller 1216(A) to a bank account of the seller 1216(A) that is held at a bank or other financial institution (e.g., associated with the server computing device(s) 1210). Scheduled deposits can occur at a prearranged time after a POS transaction is funded, which can be a business day after the POS transaction occurred, or sooner or later. In some examples, the seller 1216(A) can access funds prior to a scheduled deposit. For instance, the seller 1216(A) may have access to same-day deposits (e.g., wherein the service provider 1212 deposits funds from the stored balance to a linked bank account of the seller on a same day as POS transaction, in some examples prior to the POS transaction being funded) or instant deposits (e.g., wherein the service provider 1212 deposits funds from the stored balance to a linked bank account of the seller on demand, such as responsive to a request). Further, in at least one example, the seller 1216(A) can have a payment instrument that is linked to the stored balance that enables the seller to access the funds without first transferring the funds from the account managed by the service provider 1212 to the bank account of the seller 1216(A).

In at least one example, the service provider 1212 may provide inventory management services. That is, the service provider 1212 may provide inventory tracking and reporting. Inventory management services may enable the seller 1216(A) to access and manage a database storing data associated with a quantity of each item that the seller 1216(A) has available (i.e., an inventory). Furthermore, in at least one example, the service provider 1212 can provide catalog management services to enable the seller 1216(A) to maintain a catalog, which can be a database storing data associated with items that the seller 1216(A) has available for acquisition (i.e., catalog management services). In at least one example, the catalog may include a plurality of data items and a data item of the plurality of data items may represent an item that the seller 1261(A) has available for acquisition. The service provider 1212 can offer recommendations related to pricing of the items, placement of items on the catalog, and multiparty fulfilment of the inventory.

In at least one example, the service provider 1212 can provide business banking services, which allow the seller 1216(A) to track deposits (from payment processing and/or other sources of funds) into an account of the seller 1216(A), payroll payments from the account (e.g., payments to employees of the seller 1216(A)), payments to other sellers (e.g., business-to-business) directly from the account or from a linked debit card, withdrawals made via scheduled deposit and/or instant deposit, etc. Furthermore, the business banking services can enable the seller 1216(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the sellers 1216 to visualize their cash flow to track their financial health, set aside money for upcoming obligations (e.g., savings), organize money around goals, etc.

In at least one example, the service provider 1212 can provide financing services and products, such as via business loans, consumer loans, fixed term loans, flexible term loans, and the like. In at least one example, the service provider 1212 can utilize one or more risk signals to determine whether to extend financing offers and/or terms associated with such financing offers.

In at least one example, the service provider 1212 can provide financing services for offering and/or lending a loan to a borrower that is to be used for, in some instances, financing the borrower's short-term operational needs (e.g., a capital loan). For instance, a potential borrower that is a seller can obtain a capital loan via a capital loan product in order to finance various operational costs (e.g., rent, payroll, inventory, etc.). In at least one example, the service provider 1212 can offer different types of capital loan products. For instance, in at least one example, the service provider 1212 can offer a daily repayment loan product, wherein a capital loan is repaid daily, for instance, from a portion of transactions processed by the payment processing service on behalf of the borrower. Additionally and/or alternatively, the service provider 1212 can offer a monthly repayment loan product, wherein a capital loan is repaid monthly, for instance, via a debit from a bank account linked to the payment processing service. The credit risk of the seller may be evaluated using risk models that take into account factors, such as payment volume, credit risk of similarly situated sellers, past transaction history, seasonality, credit history, and so on.

Additionally or alternatively, the service provider 1212 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a seller, which can be one of the sellers 1216. The service provider 1212 can generate the loan based at least in part on determining that the borrower purchased or intends to purchase the item from the seller. The loan can be associated with a balance based on an actual purchase price of the item and the borrower can repay the loan over time. In some examples, the borrower can repay the loan via installments, which can be paid via funds managed and/or maintained by the service provider 1212 (e.g., from payments owed to the seller from payments processed on behalf of the seller, funds transferred to the seller, etc.). The service provider 1212 can offer specific financial products, such as payment instruments, tied specifically to the loan products. For example, in one implementation, the server provider 1212 associates capital to a seller or buyer's debit card, where the use of the debit card is defined by the terms of the loan. In some examples, the seller may only use the debit card for making specific purchases. In other examples, the "installment" associated with the loan product is credited directly via the payment instrument. The payment instrument is thus customized to the loan and/or the parties associated with the loan.

The service provider 1212 can provide web-development services, which enable users 1214 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the sellers 1216. In at least one example, the service provider 1212 can recommend and/or generate content items to supplement omni-channel presences of the sellers 1216. That is, if a seller of the sellers 1216 has a web page, the service provider 1212-via the web-development or other services—can recommend and/or generate additional content items to be presented via other channel(s), such as social media, email, etc.

Furthermore, the service provider 1212 can provide payroll services to enable employers to pay employees for work performed on behalf of employers. In at least one example, the service provider 1212 can receive data that includes time worked by an employee (e.g., through imported timecards and/or POS interactions), sales made by the employee, gratuities received by the employee, and so forth. Based on such data, the service provider 1212 can make payroll payments to employee(s) on behalf of an employer via the payroll service. For instance, the service provider 1212 can facilitate the transfer of a total amount to be paid out for the payroll of an employee from the bank of the employer to the bank of the service provider 1212 to be used to make payroll payments. In at least one example, when the funds have been received at the bank of the service provider 1212, the service provider 1212 can pay the employee, such as by check or direct deposit, often a day, a week, or more after when the work was actually performed by the employee. In additional or alternative examples, the service provider 1212 can enable employee(s) to receive payments via same-day or instant deposit based at least in part on risk and/or reliability analyses performed by the service provider 1212.

Moreover, in at least one example, the service provider 1212 can provide employee management services for managing schedules of employees. Further, the service provider 1212 can provide appointment services for enabling users 1214 to set schedules for scheduling appointments and/or users 1214 to schedule appointments.

In some examples, the service provider 1212 can provide restaurant management services to enable users 1214 to make and/or manage reservations, to monitor front-of-house and/or back-of-house operations, and so on. In such examples, the seller device(s) 1208 and/or server computing device(s) 1202 can be configured to communicate with one or more other computing devices, which can be located in the front-of-house (e.g., POS device(s)) and/or back-of-house (e.g., kitchen display system(s) (KDS)). In at least one example, the service provider 1212 can provide order management services and/or fulfillment services to enable restaurants to manage open tickets, split tickets, and so on and/or manage fulfillment services. In some examples, such services can be associated with restaurant sellers, as described above. In additional or alternative examples, such services can be any type of seller.

In at least one example, the service provider 1212 can provide fulfilment services, which can use couriers for delivery, wherein couriers can travel between multiple locations to provide delivery services, photography services, etc. Couriers can be users 1214 who can travel between locations to perform services for a requesting user 1214 (e.g., deliver items, capture images, etc.). In some examples, the courier can receive compensation from the service provider 1212. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1212 can receive requests for courier services, automatically assign the requests to active couriers, and communicate dispatch instructions to couriers via user interface (e.g., application, web browser, or other access point) presented via respective devices 1206.

In some examples, the service provider 1212 can provide omni-channel fulfillment services. For instance, if a buyer places an order with a seller and the seller cannot fulfill the order because one or more items are out of stock or otherwise unavailable, the service provider 1212 can leverage other sellers and/or sales channels that are part of the platform of the service provider 1212 to fulfill the buyer's order. That is, another seller can provide the one or more items to fulfill the order of the buyer. Furthermore, in some examples, another sales channel (e.g., online, brick-and-mortar, etc.) can be used to fulfill the order of the buyer.

In some examples, the service provider 1212 can enable conversational commerce via conversational commerce services, which can use one or more machine learning mechanisms to analyze messages exchanged between two or more users 1214, voice inputs into a virtual assistant or the like, to determine intents of user(s) 1214. In some examples, the service provider 1212 can utilize determined intents to automate buyer service, offer promotions, provide recommendations, or otherwise interact with buyers in real-time. In at least one example, the service provider 1212 can integrate products and services, and payment mechanisms into a communication platform (e.g., messaging, etc.) to enable buyers to make purchases, or otherwise transact, without having to call, email, or visit a web page or other channel of a seller. That is, conversational commerce alleviates the need for buyers to toggle back and forth between conversations and web pages to gather information and make purchases.

In at least one example, the service provider 1212 can provide a peer-to-peer payment service that enables peer-to-peer payments between two or more users 1214. In at least one example, the service provider 1212 can communicate with instances of a payment application (or other access point) installed on devices 1206 configured for operation by users 1214. In an example, an instance of the payment application executing on a first device operated by a payor can send a request to the service provider 1212 to transfer an amount of funds (e.g., fiat currency or non-fiat currency such as cryptocurrency, securities, and related assets) from an account of the payor to an account of a payee (e.g., a peer-to-peer payment). The service provider 1212 can facilitate the transfer and can send a notification to an instance of the payment application executing on a second mobile device operated by the payee that the transfer is in process (or has been completed). In some examples, the service provider 1212 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1212 funds the request to payee on behalf of the payor, to speed up the transfer process and compensate for any lags that may be attributed to payor's financial network.

In some implementations, the service provider 1212 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee yuan (¥), etc. Although use of the dollar currency indicator ($) is used herein, it is to be understood that any currency symbol could equally be used. The peer-to-peer process can be initiated through a particular application executing on the user devices 1206.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1212. For instance, the service provider 1212 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1206 (e.g., mobile device or conventional personal computer (PC)) based on instructions transmitted to and from the server computing device(s) 1202 (which, in such an example can be called a "messaging server"). In some instances, the messaging application can include a payment application with messaging capability that enables users of the payment application to communicate with one another. In such instances, the payment application can be executed on the user device 1206 based on instructions transmitted to and from the server computing device(s) 1202 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1212 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1214 may be new to the service provider 1212 such that the user 1214 that has not registered (e.g., subscribed to receive access to one or more services offered by the service provider) with the service provider 1212. The service provider 1212 can offer onboarding services for registering a potential user 1214 with the service provider 1212. In some examples, onboarding can involve presenting various questions, prompts, and the like to a potential user 1214 to obtain information that can be used to generate a profile for the potential user 1214. In at least one example, the service provider 1212 can provide limited or short-term access to its services prior to, or during, onboarding (e.g., a user of a peer-to-peer payment service can transfer and/or receive funds prior to being fully onboarded, a seller can process payments prior to being fully onboarded, etc.). In at least one example, responsive to the potential user 1214 providing all necessary information, the potential user 1214 can be onboarded to the service provider 1212. In such an example, any limited or short-term access to services of the service provider 1212 can be transitioned to more permissive (e.g., less limited) or longer-term access to such services.

The service provider 1212 can be associated with IDV services, which can be used by the service provider 1212 for compliance purposes and/or can be offered as a service, for instance to third-party service providers (e.g., associated with the server computing device(s) 1210). That is, the service provider 1212 can offer IDV services to verify the identity of users 1214 seeking to use or using their services. Identity verification requires a buyer (or potential buyer) to provide information that is used by compliance departments to prove that the information is associated with an identity of a real person or entity. In at least one example, the service provider 1212 can perform services for determining whether identifying information provided by a user 1214 accurately identifies the buyer (or potential buyer) (i.e., Is the buyer who they say they are?).

The service provider 1212 is capable of providing additional or alternative services and the services described above are offered as a sampling of services. In at least one example, the service provider 1212 can exchange data with the server computing device(s) 1210 associated with third-party service providers. Such third-party service providers can provide information that enables the service provider 1212 to provide services, such as those described above. In additional or alternative examples, such third-party service providers can access services of the service provider 1212. That is, in some examples, the third-party service providers can be subscribers, or otherwise access, services of the service provider 1212.

Techniques described herein can be configured to operate in both real-time/online and offline modes. "Online" modes refer to modes when devices are capable of communicating with the service provider 1212 (e.g., the server computing device(s) 1202) and/or the server computing device(s) 1210 via the network(s) 1204. In some examples, the seller device(s) 1208 are not capable of connecting with the service provider 1212 (e.g., the server computing device(s) 1202) and/or the server computing device(s) 1210, due to a network connectivity issue, for example. In additional or alternative examples, the server computing device(s) 1202 are not capable of communicating with the server computing device(s) 1210 due to network connectivity issue, for example. In such examples, devices may operate in "offline" mode where at least some payment data is stored (e.g., on the seller device(s) 1208) and/or the server computing device(s) 1202 until connectivity is restored and the payment data can be transmitted to the server computing device(s) 1202 and/or the server computing device(s) 1210 for processing.

In at least one example, the service provider 1212 can be associated with a hub, such as an order hub, an inventory hub, a fulfillment hub and so on, which can enable integration with one or more additional service providers (e.g., associated with the additional server computing device(s) 1210). In some examples, such additional service providers can offer additional or alternative services and the service provider 1212 can provide an interface or other computer-readable instructions to integrate functionality of the service provider 1212 into the one or more additional service providers.

Techniques described herein are directed to services provided via a distributed system of user devices 1206 that are in communication with one or more server computing devices 1202 of the service provider 1212. That is, techniques described herein are directed to a specific implementation—or, a practical application—of utilizing a distributed system of user devices 1206 that are in communication with one or more server computing devices 1202 of the service provider 1212 to perform a variety of services, as described above. The unconventional configuration of the distributed system described herein enables the server computing device(s) 1202 that are remotely-located from end-users (e.g., users 1214) to intelligently offer services based on aggregated data associated with the end-users, such as the users 1214 (e.g., data associated with multiple, different sellers and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct seller accounts, e.g., accounts within the control of the service provider 1212, and those outside of the control of the service provider 1212, to track the business standing (payables, receivables, payroll, invoices, appointments, capital, etc.) of the sellers. The techniques herein provide a consolidated view of a seller's cash flow, predict needs, preemptively offer recommendations or services, such as capital, coupons, etc., and/or enable money movement between disparate accounts (seller's, another seller's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1214 and user devices 1206. Furthermore, such features are changed dynamically based on the profiles of the users involved interacting with the GUIs. As such, techniques described herein are directed to improvements to computing systems.

Figure 13:
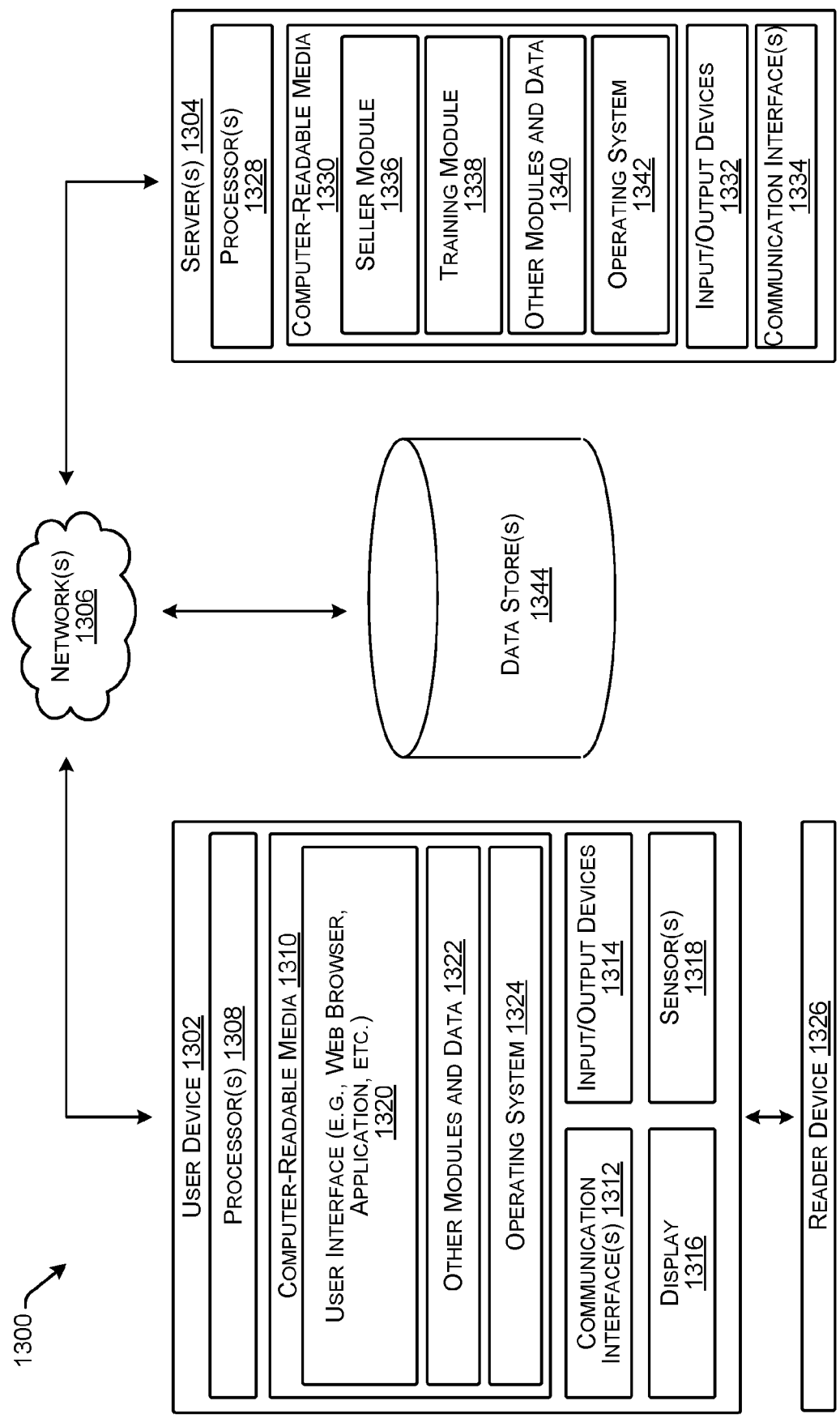
FIG. 13 illustrates additional details associated with individual components of the seller ecosystem described above in FIG. 12.

FIG. 13 depicts an illustrative block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 12.

In at least one example, entities described in FIG. 13 can correspond to entities described above with reference to FIG. 1. For example, the server(s) 1304 can correspond to the server(s) 102, the user device 1302 can correspond to the owner/seller device 104 and/or the user device(s) 106, and the network(s) 1306 can correspond to the network(s) 108.

As described above, techniques described herein are directed to intelligently identifying items (e.g., goods, services, etc.) for sale or resale based on digital records of past purchases. In an example, a system 1300, as illustrated in FIG. 13, can scan, or otherwise monitor, digital records including emails, text messages, social media posts, peer-to-peer payment transactions, and the like, to learn about past purchases of users. In at least one example, the components of the system 1300 can parse the digital records to identify items purchased via transactions and information associated with such items (e.g., price, characteristics, etc.). Components of the system 1300 can identify an item as a candidate for resale to another user. Additionally, components of the system 1300 can scan marketplaces (e.g., AMAZON®, ETSY®, EBAY®, etc.) to determine an amount for which the item (e.g., other instances thereof) and/or item(s) similar to the item is/are being sold. In at least one example, components of the system 1300 can prompt the owner of the item to sell the item, by presenting the owner with information regarding the resale value of the item and/or a level of interest associated with the item. The owner of the item can opt to list the item for sale and the service provider can facilitate any resulting transaction. That is, components of the system 1300 can identify items that are capable of being sold, based on factors such as market interest, profitability associated with re-sale, etc., and then create marketplaces for such items, even when the owner is not a traditional merchant. By converting purchased items into sellable items, the platforms described herein provide frictionless and structured ways to buy and sell.

Techniques described herein can utilize a network-based seller ecosystem, such as the system 1300 described herein, to generate a marketplace for users that have previously purchased items to sell such items to other users. That is, techniques described here can leverage integrated functionality, provided by a service provider that can be remotely located from the end users having the integrated functionality, to monitor digital records of previous purchases and to turn such previous purchases into selling opportunities (e.g., inventory). The service provider can then leverage integrated services, such as inventory management, content generation, payment processing, and the like to facilitate transactions as described herein. Techniques described herein can be useful for streamlining the resale (and/or return) process by utilizing information provided in association with a previous purchase to generate item information, which can track the item via one or more transactions facilitated by the service provider.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, modules or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a user interface 1320 to enable users to interact with the user device 1302, and thus the server(s) 1304 and/or other networked devices. In at least one example, the user interface 1320 can be presented via a web browser, or the like. In other examples, the user interface 1320 can be presented via an application, such as a mobile application or desktop application, which can be provided by a service provider 1212 associated with the server(s) 1304, or which can be an otherwise dedicated application. In some examples, the user interface 1320 can be the user interface(s) 124 described above with reference to FIG. 1. In at least one example, a user can interact with the user interface via touch input, spoken input, gesture, or any other type of input. The word "input" is also used to describe "contextual" input that may not be directly provided by the user via the user interface 1320. For example, user's interactions with the user interface 1320 are analyzed using, e.g., natural language processing techniques, to determine context or intent of the user, which may be treated in a manner similar to "direct" user input.

Depending on the type of the user device 1302, the computer-readable media 1310 can also optionally include other functional components and data, such as other modules and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1212, described above, to provide one or more services. That is, in some examples, the service provider 1212 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1214 and/or for sending users 1214 notifications regarding available appointments with seller(s) located proximate to the users 1214. In at least one example, location can be used for taking payments from nearby buyers when they leave a geofence, or location can be used to initiate an action responsive to users 1214 enter a brick-and-mortar store of a seller. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a buyer slides a card having a magnetic strip through a payment reader that captures payment data contained in the magnetic strip), a dip (i.e., a card-present transaction where a buyer inserts a card having an embedded microchip (i.e., chip) into a payment reader first until the payment reader prompts the buyer to remove the card), or a tap (i.e., a card-present transaction where a buyer may tap or hover his or her electronic device such as a smart phone running a payment application over a payment reader to complete a transaction via short-range communication) to obtain payment data associated with a buyer. Additionally or optionally, the reader device 1326 may also include a biometric sensor to receive and process biometric characteristics and process them as payment instruments, given that such biometric characteristics are registered with the payment service system 100 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more modules and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one module for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 136, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single seller or enterprise, or can be provided by the servers and/or services of multiple different buyers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program modules, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider 1212 and/or payment processing service. Functional components stored in the computer-readable media 1330 can optionally include a seller module 1336, a training module 1338, and one or more other modules and data 1340.

The seller module 1336 can be configured to receive transaction data from POS systems, such as the POS system 1224 described above with reference to FIG. 12. The seller module 1336 can transmit requests (e.g., authorization, capture, settlement, etc.) to payment service server computing device(s) to facilitate POS transactions between sellers and buyers. The seller module 1336 can communicate the successes or failures of the POS transactions to the POS systems.

The training module 1338 can be configured to train models using machine-learning mechanisms. For example, a machine-learning mechanism can analyze training data to train a data model (e.g., a machine-trained model) that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1302 and/or the server(s) 1304 for use at a time after the data models have been trained (e.g., at runtime).

The one or more other modules and data 1340 can the item selection module 114, the item information module 116, the content generation module 117, the payment processing module 118, and API(s) 120, the functionality of which is described, at least partially, above. Further, the one or more other modules and data 1340 can include programs, drivers, etc., and the data used or generated by the functional components. Further, the server(s) 1304 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include seller profiles, buyer profiles, and so on.

Seller profiles can store, or otherwise be associated with, data associated with sellers. For instance, a seller profile can store, or otherwise be associated with, information about a seller (e.g., name of the seller, geographic location of the seller, operating hours of the seller, employee information, etc.), a seller category classification (MCC), item(s) offered for sale by the seller, hardware (e.g., device type) used by the seller, transaction data associated with the seller (e.g., transactions conducted by the seller, payment data associated with the transactions, items associated with the transactions, descriptions of items associated with the transactions, itemized and/or total spends of each of the transactions, parties to the transactions, dates, times, and/or locations associated with the transactions, etc.), loan information associated with the seller (e.g., previous loans made to the seller, previous defaults on said loans, etc.), risk information associated with the seller (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, buyer service data, etc. The seller profile can securely store bank account information as provided by the seller. Further, the seller profile can store payment information associated with a payment instrument linked to a stored balance of the seller, such as a stored balance maintained in a ledger by the service provider 1212.

Buyer profiles can store buyer data including, but not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

Furthermore, in at least one example, the datastore 1344 can store inventory database(s) and/or catalog database(s). As described above, an inventory can store data associated with a quantity of each item that a seller has available to the seller. Furthermore, a catalog can store data associated with items that a seller has available for acquisition. The datastore 1344 can store additional or alternative types of data as described herein.

In at least one example, the inventory database(s) and/or catalog database(s) can store the catalog and/or inventory records described above. That is, records generated for individual items (e.g., identified as candidate items for resale) can be stored in the datastore 1344. Such records can be associated with item information, as described above.

Moreover, in at least one example, the datastore 1344 can store digital records indicative of transactions processed by a payment processing service associated with the server(s) 1304. Such digital records can offer proof of purchase and can be associated with information including, but not limited to, item(s) sold, item information, a total cost of the transaction, cost(s) of individual item(s), payment data used to satisfy the cost of the transaction, and other information associated with the transaction.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1, 12, and 13 for convenience and ease of understanding. However, the methods illustrated are not limited to being performed using components described in FIGS. 1, 12, and 13, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A method, performed at least in part by a computing system of a service provider, the method comprising:
    analyzing, using natural language processing or image processing, digital records of a user that are representative of previous purchases of the user from sellers associated with the service provider, wherein the service provider processes payments for first transactions performed via one or more ecommerce channels;
    identifying, by the computing system, without input from the user and based on the analyzing of the digital records, an item previously purchased by the user that is a candidate for resale to another user;
    continuously monitoring, by the computing system and in real-time, one or more marketplaces;
    identifying, based at least in part on the real-time monitoring, a triggering event associated with the item previously purchased by the user;
    determining, by the computing system, in response to the triggering event and based at least in part on information associated with the payments for the first transactions processed by the service provider, a recommended resale value of the item without input from the user;
    automatically generating, by the computing system and in response to the determining, item information based at least in part on (i) a digital record associated with the item, and (ii) the recommended resale value of the item;
    sending, from the computing system and to a computing device operable by the user, a notification that identifies the item as the candidate for resale to one or more other users and includes the item information, wherein the item information enables the user to offer the item for sale via an ecommerce channel associated with the service provider;
    receiving, by the computing system and from another device operable by the other user, an indication that the other user desires to purchase the item;

processing, by the computing system and responsive to receiving the indication that at another user of the one or more other users desires to purchase the item, a second transaction on behalf of the user to enable the other user to purchase the item from the user, wherein the second transaction is processed based at least in part on the item information.

2. The method as claim 1 recites, wherein the digital records comprise one or more of emails, text messages, social media posts, or peer-to-peer payment transactions.

3. The method as claim 1 recites, further comprising:
receiving, from the other device operable by the other user, a request to return the item, wherein the request is associated with an identifier identifying the item;
accessing the item information associated with the item based at least in part on the identifier; and
processing the return based at least in part on the item information associated with the item.

4. The method as claim 1 recites, further comprising:
receiving, from the other device operable by the other user, a request to resell the item, wherein the request is associated with an identifier identifying the item;
accessing the item information associated with the item based at least in part on the identifier; and
generating content to enable the other user to list the item for resale based at least in part on the item information associated with the item.

5. The method as claim 4 recites, further comprising:
determining, based at least in part on monitoring the marketplaces, an updated resale value of the item; and
prior to generating the content, updating the item information based at least in part on the updated resale value of the item.

6. A system comprising:
one or more processors;
one or more computer-readable media storing instructions that, when executed by the one or more processors, cause the one or more processors to perform operations comprising:
analyzing, using natural language processing or image processing, one or more digital records of a user that are representative of one or more previous purchases of the user from one or more sellers associated with a payment processing service, wherein the payment processing service processed one or more transactions associated with the one or more previous purchases;
identifying, based at least in part on the analyzing the one or more digital records and monitoring one or more marketplaces, and without input from the user, an item previously purchased by the user that is a candidate for resale to one or more other users;
continuously monitoring, in real-time, one or more marketplaces;
identifying, based at least in part on the real-time monitoring, a triggering event associated with the item previously purchased by the user;
determining, based at least in part on the triggering event, at least a portion of item information for the item;
automatically creating, based at least in part on the portion of item information and in response to the determining, a listing for an ecommerce channel that enables the user to sell the item via the ecommerce channel, wherein the listing includes an actuation mechanism that enables another user of the one or more other users to purchase the item;
receiving, from another device operable by the other user and via the actuation mechanism, an indication that the other user desires to purchase the item; and
processing, by the payment processing service, a transaction associated with the item.

7. The system as claim 6 recites, the operations further comprising:
accessing a digital record of the one or more digital records that corresponds to the item; and
determining at least an additional portion of the item information based at least in part on the digital record, wherein the additional portion of the item information includes at least one of a characteristic of the item or an identifier of the item.

8. The system as claim 6 recites, the operations further comprising:
identifying, based at least in part on analyzing the one or more digital records, at least one digital record that meets a filtering criteria; and
excluding at least a portion of the at least one digital record from consideration for identifying candidate items for resale to other users.

9. The system as claim 6 recites, the operations further comprising:
identifying, based at least in part on analyzing the one or more digital records, at least one digital record associated with a rare item, an antique item, or a collectable item; and
prioritizing the at least one digital record for consideration for identifying candidate items for resale to other users.

10. The system as claim 6 recites, the operations further comprising:
determining, based at least in part on monitoring the one or more marketplaces, that one or more additional instances of the item have been sold at a frequency that meets or exceeds a threshold; and
identifying the item as the candidate for resale to the other user based at least in part on determining that the one or more additional instances of the item have been sold at the frequency that meets or exceeds the threshold.

11. The system as claim 6 recites, the operations further comprising:
determining, based at least in part on monitoring the one or more marketplaces, that a number of additional instances of the item that have been sold meets or exceeds a threshold; and
identifying the item as the candidate for resale to the other user based at least in part on determining that the number of additional instances of the item that have been sold meets or exceeds the threshold.

12. The system as claim 6 recites, the operations further comprising:
determining, based at least in part on monitoring the one or more marketplaces, that at least one additional instance of the item has been sold at a price that meets or exceeds a threshold; and
identifying the item as the candidate for resale to the other user based at least in part on determining that the at least one additional instance of the item has been sold at the price that meets or exceeds the threshold.

13. The system as claim 6 recites, the operations further comprising:
determining, based at least in part on monitoring one or more social media channels, that one or more users have referenced the item via one or more posts at least one of (i) a number of times that meets or exceeds a first threshold or (ii) at a frequency that meets or exceeds a second threshold; and
identifying the item as the candidate for resale to the other user based at least in part on determining that one or more users have referenced the item via one or more posts at least one of (i) the number of times that meets or exceeds the first threshold or (ii) at the frequency that meets or exceeds the second threshold.

14. The system as claim 6 recites, the operations further comprising:
   determining, based at least in part on monitoring one or more search engines, that one or more users have searched for the item at least one of (i) a number of times that meets or exceeds a first threshold or (ii) at a frequency that meets or exceeds a second threshold; and
   identifying the item as the candidate for resale to the other user based at least in part on determining that one or more users have searched for the item at least one of (i) the number of times that meets or exceeds the first threshold or (ii) at the frequency that meets or exceeds the second threshold.

15. A method, performed at least in part by a computing system of a payment processing service, the method comprising:
   analyzing, using natural language processing or image processing, one or more digital records of a user that are representative of one or more previous purchases of the user from one or more sellers associated with the payment processing service, wherein the payment processing service processed one or more transactions associated with the one or more previous purchases;
   continuously monitoring, in real-time, one or more social media channels, one or more search engines, or one or more marketplaces;
   identifying, based at least in part on the analyzing of the one or more digital records and the continuous real-time monitoring, and without input from the user, an item previously purchased by the user that is a candidate for resale to one or more other users;
   identifying, based at least in part on the real-time monitoring, a triggering event associated with the item previously purchased by the user;
   determining, based at least in part on the triggering event, at least a portion of item information for the item;
   automatically creating, based at least in part on the portion of item information and in response to the determining, a listing for an ecommerce channel that enables the user to sell the item via the ecommerce channel, wherein the listing includes an actuation mechanism that enables another user of the one or more other users to purchase the item;
   receiving, from another device operable by the other user and via the actuation mechanism, an indication that the other user desires to purchase the item; and
   processing, by the payment processing service, a transaction associated with the item.

16. The method as claim 15 recites, further comprising:
   determining, based at least in part on the monitoring, a level of interest associated with the item; and
   identifying the item as the candidate for resale to the other user based at least in part on the level of interest.

17. The method as claim 15 recites, further comprising:
   determining, based at least in part on analyzing one or more additional digital records of one or more additional users, a subset of the one or more additional users that are similar to the user; and
   sending, to one or more computing devices operable by the subset of the one or more additional users, an offer to purchase the item from the user.

18. The method as claim 15 recites, further comprising:
   determining, based at least in part on analyzing one or more additional digital records of one or more additional users, a subset of the one or more additional users that are similar to the user; and
   determining, based at least in part on monitoring the one or more marketplaces and the subset of the one or more additional users, a recommended resale value for the item.

19. The method as claim 15 recites, further comprising:
   accessing one or more images of the item;
   determining, based at least in part on a digital record of the one or more digital records with which the item is associated or a profile of the user, a characteristic associated with the item;
   selecting an image of the one or more images based at least in part on the characteristic associated with the item; and
   generating the listing based at least in part on the image.

20. The method as claim 15 recites, further comprising presenting an indication of the item via a graphical user interface that enables the user to monitor one or more items that the user has purchased, has available for sale, or has sold.

* * * * *